(12) United States Patent
Kuse et al.

(10) Patent No.: US 7,494,728 B2
(45) Date of Patent: Feb. 24, 2009

(54) MAGNETIC TAPE AND MAGNETIC TAPE CARTRIDGE

(75) Inventors: Sadamu Kuse, Minoo (JP); Tsugihiro Doi, Ibaraki (JP); Tetsutaro Inoue, Ikeda (JP); Mikio Kishimoto, Moriya (JP)

(73) Assignee: Hitachi Maxell, Ltd., Osaka (JP)

( * ) Notice: Subject to any disclaimer, the term of this patent is extended or adjusted under 35 U.S.C. 154(b) by 132 days.

(21) Appl. No.: 10/383,768

(22) Filed: Mar. 10, 2003

(65) Prior Publication Data

US 2004/0110037 A1    Jun. 10, 2004

(30) Foreign Application Priority Data

Apr. 25, 2002    (JP)    ............... P2002-125029

(51) Int. Cl.
  *G11B 5/716*    (2006.01)
(52) U.S. Cl. .................. 428/840.2; 428/845.5
(58) Field of Classification Search ........... 428/694 BA, 428/694 BS, 323, 336, 840.2, 840.3, 842.1, 428/845.1, 845.2, 845.5
See application file for complete search history.

(56) References Cited

U.S. PATENT DOCUMENTS

| | | | |
|---|---|---|---|
| 4,324,177 A | 4/1982 | Tsuji et al. | |
| 4,863,793 A | 9/1989 | Ogawa et al. | |
| 4,952,444 A | 8/1990 | Kawamata et al. | |
| 4,963,433 A | 10/1990 | Ogawa et al. | |
| 5,252,380 A | 10/1993 | Nakazumi et al. | |
| 5,277,702 A | 1/1994 | Thibault et al. | |
| 5,380,905 A | 1/1995 | Haidos et al. | |
| 5,419,943 A * | 5/1995 | Meguro et al. | 428/141 |
| 5,496,607 A | 3/1996 | Inaba et al. | |
| 5,587,010 A | 12/1996 | Shibasaki et al. | |
| 5,637,390 A | 6/1997 | Isobe et al. | |
| 5,645,917 A | 7/1997 | Ejiri et al. | |
| 5,756,148 A | 5/1998 | Ejiri et al. | |
| 5,763,046 A | 6/1998 | Ejiri et al. | |
| 5,780,141 A | 7/1998 | Ejiri et al. | |
| 5,792,543 A | 8/1998 | Ejiri et al. | |
| 5,795,646 A | 8/1998 | Ejiri et al. | |
| 5,811,166 A | 9/1998 | Ejiri et al. | |
| 5,811,172 A | 9/1998 | Ejiri et al. | |
| 5,827,600 A | 10/1998 | Ejiri et al. | |

(Continued)

FOREIGN PATENT DOCUMENTS

JP    37-7750    7/1962

(Continued)

*Primary Examiner*—Holly Rickman
(74) *Attorney, Agent, or Firm*—Birch, Stewart, Kolasch & Birch, LLP

(57) ABSTRACT

A magnetic tape comprising a non-magnetic support, a magnetic layer containing magnetic powder which is formed on one side of the non-magnetic support, a primer layer containing non-magnetic powder which is formed between the non-magnetic support and the magnetic layer, and a backcoat layer containing non-magnetic powder which is formed on the other side of the non-magnetic support, wherein the magnetic layer contains the magnetic powder which comprises plate, granular or ellipsoidal magnetic particles with a particle diameter of 5 to 50 nm, and has a thickness of 0.09 μm or less, and wherein at least one of the primer layer and the backcoat layer contains non-magnetic plate particles with a particle diameter of 10 to 100 nm.

13 Claims, 2 Drawing Sheets

U.S. PATENT DOCUMENTS

| | | | |
|---|---|---|---|
| 5,851,622 A | 12/1998 | Ejiri et al. | |
| 5,958,565 A | 9/1999 | Hattori et al. | |
| 5,985,408 A | 11/1999 | Ejiri et al. | |
| 6,015,602 A | 1/2000 | Ejiri et al. | |
| 6,020,022 A | 2/2000 | Ejiri et al. | |
| 6,025,082 A | 2/2000 | Ejiri et al. | |
| 6,103,365 A | 8/2000 | Ishii et al. | |
| 6,143,403 A | 11/2000 | Ejiri et al. | |
| 6,207,267 B1 | 3/2001 | Shimomura et al. | |
| 6,228,461 B1 | 5/2001 | Sueki et al. | |
| 6,251,509 B1 | 6/2001 | Kawamata et al. | |
| 6,319,595 B1 | 11/2001 | Katashima et al. | |
| 6,727,009 B2 | 4/2004 | Masaki et al. | |
| 6,797,381 B1 * | 9/2004 | Tsukuda et al. | 428/409 |
| 2001/0024741 A1 * | 9/2001 | Ochi et al. | 428/694 SG |
| 2001/0054340 A1 | 12/2001 | Fujikata | |
| 2002/0141103 A1 | 10/2002 | Saliba et al. | |
| 2003/0113585 A1 * | 6/2003 | Mori et al. | 428/694 BH |

FOREIGN PATENT DOCUMENTS

| | | |
|---|---|---|
| JP | 39-13465 | 7/1964 |
| JP | 60-107730 | 6/1985 |
| JP | 60-50323 | 11/1985 |
| JP | 64-78427 A | 3/1989 |
| JP | 4-19815 | 1/1992 |
| JP | 4-195819 A | 7/1992 |
| JP | 5-46971 A | 2/1993 |
| JP | 5-73882 A | 3/1993 |
| JP | 5-128487 A | 5/1993 |
| JP | 5-210835 A | 8/1993 |
| JP | 5-234064 | 9/1993 |
| JP | 5-242463 | 9/1993 |
| JP | 5-307730 A | 11/1993 |
| JP | 5-307736 A | 11/1993 |
| JP | 6-25702 | 2/1994 |
| JP | 6-18062 | 3/1994 |
| JP | 6-139553 | 5/1994 |
| JP | 6-316413 | 11/1994 |
| JP | 7-98834 A | 4/1995 |
| JP | 8-96345 | 4/1996 |
| JP | 9-54939 A | 2/1997 |
| JP | 9-198650 A | 7/1997 |
| JP | 2698770 B2 | 9/1997 |
| JP | 10-134343 A | 5/1998 |
| JP | 10-228623 | 8/1998 |
| JP | 11-96545 A | 4/1999 |
| JP | 11-120540 A | 4/1999 |
| JP | 11-126328 | 5/1999 |
| JP | 11-213385 A | 8/1999 |
| JP | 11-250449 A | 9/1999 |
| JP | 11-259849 A | 9/1999 |
| JP | 2000-40217 | 2/2000 |
| JP | 2000-40218 | 2/2000 |
| JP | 2000-155938 A | 6/2000 |
| JP | 2000-173046 A | 6/2000 |
| JP | 2000-293836 | 10/2000 |
| JP | 2001-23143 A | 1/2001 |
| JP | 2001-67649 A | 3/2001 |
| JP | 2001-134919 | 5/2001 |
| JP | 2001-256633 | 9/2001 |
| JP | 2002-56518 A | 2/2002 |
| JP | 2002-74640 | 3/2002 |
| JP | 2002-123928 | 4/2002 |
| WO | WO/03/017259 A1 | 2/2003 |

* cited by examiner

MAGNETIC TAPE AND MAGNETIC TAPE CARTRIDGE

TECHNICAL FIELD

The present invention relates to a coating type magnetic tape with a high recording density.

BACKGROUND ART

Magnetic tapes have found various applications in audio tapes, videotapes, computer tapes, etc. In particular, in the field of magnetic tapes for data-backup (or backup tapes), tapes with memory capacities of several tens to 100 GB per reel are commercialized in association with increased capacities of hard discs for back-up. In future, a backup tape with a capacity of 1 TB or more will be proposed, and it is indispensable for such a backup tape to have a higher recording density.

In the production of a magnetic tape capable of meeting such a demand for higher recording density, advanced techniques are required for production of very fine magnetic powder, highly dense dispersion of such magnetic powder in a coating layer, smoothing of such a coating layer, and formation of a thinner magnetic layer.

To increase the recording density, recording signals with shorter wavelength and tracks with shorter pitches are required, and there has been emerged a system using servo tracks so that a reproduction head can correctly trace the tracks.

To meet the main demand for recording of signals with shorter wavelength, magnetic powder for use in magnetic tape have been improved to have more and more fine particle size and also improved in magnetic characteristics. In the field of the existing data backup tape, magnetic powders of ferromagnetic iron oxide, Co-modified ferromagnetic iron oxide, chromium oxide and the like, used in audio systems and household video tapes have been dominantly used. Presently, needle-shape metallic magnetic powder having a particle size of 100 nm or so has been proposed. On the other hand, to prevent a decrease in output due to demagnetization in recording signals with shorter wavelengths, backup tapes with higher coercive forces have been vigorously developed year by year. As a result of such developments, backup tapes with coercive forces of about 198.9 kA/m have been accomplished by the use of iron-cobalt alloys (JP-A-3-49026, JP-A-5-234064, JP-A-6-25702, JP-A-6-139553, etc.).

In the meantime, the media-producing techniques have been significantly advanced by the development of binder resins having a variety of functional groups, the improvement of the dispersing technique for the above magnetic powder, and further the improvement of the technique of calendering after the coating step. These improvements have markedly improved the surface smoothness of magnetic layers and contributed greatly to an increase in output of signals with shorter wavelengths (for example, JP-B-64-1297, JP-B-7-60504, JP-A-4-19815, etc.).

In association with the recent high density recording, the recording wavelength becomes shorter and shorter. Therefore, in case where the thickness of a magnetic layer is large, the saturation magnetization and the coercive force of conventional magnetic powder are insufficient within the shortest recording wavelength region, so that the reproducing output decreases to a fraction thereof. Further, because the recording wavelength is very short, self demagnetization loss and thickness loss due to the thickness of a magnetic layer give adverse influences on the resolution, although such demagnetization loss and thickness loss which occur when recorded signals are reproduced have not arisen so serious problem so far. This problem can not be overcome by the above improvement of the magnetic characteristics of magnetic powder and the improvement of the surfaces of magnetic layers by the medium-producing technique. Under such circumstances, it is proposed that the thickness of a magnetic layer should be reduced.

Generally, it is said that the effective thickness of a magnetic layer is about one third of the shortest recording wavelength used in the system. For example, the thickness of a magnetic layer is required to be about 0.1 μm when the shortest recording wavelength is 0.3 μm. With the trend of compacting a cassette (or a cartridge) for holding tape, a whole of magnetic tape is needed to be thinner so as to increase the recording capacity per volume. To meet such a demand, it is consequently needed to form a thinner magnetic layer. Further, to increase the recording density, a magnetic flux for writing which a magnetic head generates should have a very small area. In this connection, compacting of the magnetic head results in a smaller amount of magnetic flux generated thereby. In order for the above very small magnetic flux to cause a perfect magnetic inversion, it is necessary that a magnetic layer should be formed with a thinner thickness.

However, there arise other problems in the formation of a thinner magnetic layer. That is, when the thickness of a magnetic layer is reduced, the surface roughness of a non-magnetic support gives an adverse influence on the surface of the magnetic layer, so that the surface smoothness of the magnetic layer degrades. When a single magnetic layer is formed with a thin thickness, the solid content in a paint for magnetic layer should be decreased, or the amount of the paint to be applied should be decreased. However, the defects of coating are not eliminated and the filling of magnetic powder is not improved by these methods, which results in poor film strength. To overcome this problem, the following concurrent coating-and-laminating method is proposed: that is, in case where a thinner magnetic layer is formed by an improved medium-producing technique, a primer layer is provided between a non-magnetic support and a magnetic layer, and the upper magnetic layer is applied on the primer layer which is still in a wet state (JP-A-63-187418, JP-A-63-191315, JP-A-5-73883, JP-A-5-217148, JP-A-5-298653, etc.).

When the recording density in the tape-widthwise direction is increased by narrowing the width of the recording tracks, magnetic flux leaking from the magnetic tape is decreased. Therefore, it is needed that MR heads using magneto-resistance elements, which can achieve high output even when the magnetic fluxes are very small, are used for reproducing heads.

Examples of a magnetic tape which can correspond to MR heads are disclosed in JP-A-11-238225, JP-A-2000-40217 and JP-A-2000-40218. In the magnetic recording media described in these publications, skewness of outputs from the MR heads is prevented by controlling the magnetic fluxes from the magnetic recording media (a product of a residual magnetic flux density and the thickness of a medium) to a specific value or less, or the thermal asperity of the MR heads is reduced by controlling the dents on the surface of the magnetic layer to a specified value or less.

When the width of the recording tracks is decreased, the reproducing output lowers due to off-track. To avoid such a problem, track servo control is needed. As types of such track servo control, there are an optical servo system (JP-A-11-213384, JP-A-11-339254 and JP-A-2000-293836) and a magnetic servo system. In either of these systems, it is necessary that track servo control is performed on a magnetic tape which is drawn out from a magnetic tape cartridge (or a cassette tape) of single reel type which houses only one reel for winding the magnetic tape, in a box-shaped casing body. The reason for using a single reel type cartridge is that, when the tape-running speed is increased (for example, 2.5 m/second or higher), a tape can not be reliably run in a two-reel type cartridge which has two reels for drawing out the tape and for winding the same. The two-reel type cartridge has other problems in that the dimensions of the cartridge become larger and that the memory capacity per volume becomes smaller.

As mentioned above, there are two types of track servo systems, i.e., the magnetic servo system and the optical servo system. In the former track servo system, servo track bands are formed on a magnetic layer by magnetically recording, and servo tracking is performed by magnetically reading such servo track bands. In the latter optical servo type, servo track bands each consisting of an array of pits are formed on a backcoat layer by laser irradiation or the like, and servo tracking is performed by optically reading such servo track bands. Other than these types, there is such magnetic serve system in which magnetic servo signals are recorded on a magnetized backcoat layer (for example, JP-A-11-126327). Further, in other optical servo system, optical servo signals are recorded on a backcoat layer, using a material capable of absorbing light or the like (for example, JP-A-11-126328).

In general, recording tracks are written in the tape lengthwise direction in a linear recording type computer tape, and the width of the tracks of a reproducing head (reproducing track width) is set at a value fairly smaller than the recording track width: for example, the recording track width is about 28 μm, while the reproducing track width is about 12 μm; or the recording track width is about 24 μm, while the reproducing track width is about 12 μm. By doing so, the off-track margin is increased, and thus, a decrease in reproducing output is hardly caused, even when the position of the magnetic tape is dislocated by about 3 μm (dislocation due to edge weave on the tape or a change in size due to changes in temperature and/or humidity) or when there is about 3 μm of dislocation of tracks between each of units. Because of such a sufficient off-track margin, it is not needed to pay a careful attention on the edge weave of the magnetic tape or the widthwise dimensional stability thereof against changes in temperature and/or humidity.

PROBLEMS TO BE SOLVED BY THE INVENTION

However, the improvement of the magnetic powder and the medium-fabricating techniques have now reached the uppermost limit. Particularly in the improvement of the magnetic powder of needle particle type, the particle size thereof is reduced to about 100 nm as the smallest in view of practical use. This is because, when the particle size is smaller than about 100 nm, the specific surface area of the magnetic powder markedly increases, and the saturation magnetization lowers, and also, it becomes very difficult to disperse such magnetic powder in a binder resin.

The technical innovation of magnetic heads has made it possible to record signals on media having high coercive forces. Particularly in the lengthwise recording system, it is desirable that the coercive force of a magnetic layer should be as high as possible to an extent that the erasing of the recorded signals by a magnetic head is possible, so as to prevent a decrease in output because of demagnetization by recording and reproducing. Therefore, the practical and most effective method for improving the recording density of a magnetic recording medium is to increase the coercive force of a magnetic recording medium.

To lessen the influence of a decrease in output due to demagnetization by recording and reproducing which is the essential problem of the lengthwise recording system, it is effective to further decrease the thickness of a magnetic layer. However, there is a limit in the thickness of a magnetic layer, as long as the above magnetic powder having a needle particle size of about 100 nm is used. The needle particles are generally arrayed such that the needle-pointed direction can be in parallel to the in-plane direction of a medium, because of the lengthwise orientation of the needle particles. However, some of the needle particles are arrayed vertically to the plane of the medium, since there is a distribution in the dispersion of the particles. Because of such needle particles, the surface of the medium becomes uneven to increase the level of noises. This problem becomes more serious as the thickness of the magnetic layer is more and more thinner.

In case where a magnetic layer is formed with a thinner thickness, it is needed to dilute a paint for magnetic coating with a large amount of an organic solvent. The conventional needle particle type magnetic powder tends to agglomerate paints for magnetic coating. In addition, the large amount of the organic solvent is evaporated off when the magnetic layer is dried, which degrades the orientation of the magnetic powder. Thus, the lengthwise recording tape medium becomes poor in the orientation, and it becomes difficult to obtain desired electromagnetic conversing characteristics there from because of degradation of the orientation and the surface of the magnetic layer, even though the magnetic layer is formed thinner. In spite of the known fact that the use of a thinner magnetic layer is effective to improve the recording characteristics in the lengthwise recording system, it is still difficult to obtain a coating type magnetic recording medium which comprises a magnetic layer with a far reduced thickness, insofar as the conventional needle particle type magnetic powder is used.

Among several kinds of magnetic powder which hitherto have been proposed, barium ferrite magnetic powder is known which comprises plate particles and has a particle size (or a particle diameter) of about 50 nm (for example, JP-B-60-50323, JP-B-6-18062, etc.). This barium ferrite magnetic powder is more suitable for a thin layer coating type magnetic recording medium, than the needle particle type magnetic powder, because of the particle shape and particle size (or particle diameter) of the barium ferrite magnetic powder. However, since the barium ferrite magnetic powder is an oxide, its saturation magnetization is about 70 A.m$^2$/kg (70 emu/g) at most, and therefore, it is theoretically impossible to obtain saturation magnetization of 100 A.m$^2$/kg (100 emu/g) or more which needle particle type metal or alloy magnetic powder can show. The use of the barium ferrite magnetic powder makes it possible to obtain a coating type magnetic recording medium having a thin magnetic layer, but is unsuitable for a high density magnetic recording medium for use in a conventional system which uses a magnetic induction type magnetic head as a reproducing head, because the output is low due to low magnetic flux density. For this reason, the foregoing needle particle type magnetic powder has been dominantly used as the magnetic powder for high density magnetic recording media. However, in a system in which a highly responsive magnetoresistance type magnetic head is used for a reproducing head, the above defects of the barium ferrite magnetic powder can be eliminated. Therefore, it is possible to use the barium ferrite magnetic powder in a magnetic recording medium according to the present invention.

As is understood from the above description, in the formation of a magnetic layer with a thin thickness which is one of the effective methods for improving the recording density of a magnetic recording medium, it is very important to maintain the coercive force and the saturation magnetization of magnetic powder at values as high as possible and simultaneously to reduce the particle size thereof. To achieve this subject matter, the present inventors, firstly, have paid their attentions on the magnetic characteristics of the conventional magnetic powder and found that a theoretical limit is present in achieving a higher coercive force since the conventional needle particle type magnetic powder gains a coercive force based on the shape anisotropy induced by its needle particles. In other words, in the shape anisotropy, the magnitude of the magnetic anisotropy is expressed by $2\pi Is$ (wherein 'Is' represents saturation magnetization), and is proportional to the saturation magnetization. Therefore, the coercive force of the needle particle type magnetic powder based on the shape anisotropy becomes larger in proportion to an increase in saturation magnetization.

As is well known from the Slater-Pauling curve, the saturation magnetization of a metal or an alloy, for example, a Fe—Co alloy, shows a maximal value at the ratio of Fe/Co of about 70/30. Therefore, the coercive force of this alloy shows a maximal value at the above composition ratio. Needle particle type magnetic powder of Fe—Co alloy in the ratio about 70/30 has already been practically used. However, as has been described above, whenever the needle particle type magnetic powder is used, the coercive force thereof is theoretically limited to about 198.9 kA/m at most at the present, and it is difficult to achieve a higher coercive force under the present circumstances. Therefore, the use of such needle particle type magnetic powder is unsuitable for a thin layer coating type magnetic recording medium.

The magnitude of magnetic anisotropy in the shape anisotropy is expressed by $2\pi Is$ as mentioned above, and the coefficient is represented by $2\pi$ when the an aspect of magnetic powder (the particle length/the particle diameter) is not smaller than about 5. When the an aspect is smaller than 5, the coefficient rapidly becomes smaller. When the particle shape is spherical, the anisotropy thereof vanishes. In other words, in the state of the art, insofar as a magnetic material such as a Fe metal, a Fe—Co alloy or the like is used as magnetic powder, the particle shape of the magnetic powder inevitably and theoretically results in the shape of needle.

Also, in the prior art, a primer layer with a thickness of about 2.0 µm is formed on an non-magnetic support, and a magnetic layer with a thickness of about 0.15 to about 0.2 µm is formed on the primer layer, in order to improve the characteristics of recording/reproducing of signals with short wavelength. To further improve the recording density, the thickness of the magnetic layer is preferably 0.01 µm to 0.09 µm, more preferably 0.06 µm or less, particularly 0.04 µm or less. The thickness of the primer layer is preferably 0.2 µm or more, more preferably 0.3 µm or more. The thickness of the primer layer is preferably 1.0 µm or less, more preferably 0.8 µm or less, particularly 0.5 µm or less. In this regard, preferably the primer layer is non-magnetic. If the primer layer is magnetic, the record on the magnetic layer formed on the primer layer is disturbed by the magnetically recorded signals on the primer layer, or the magnetically recorded signals on the primer layer may skew reproduced signals.

As mentioned above, for a higher recording capacity of a computer tape, the pitches between each of the recording tracks become narrower and narrower, and the recording capacity per one reel of tape is reaching 1 TB. To exceed 1 TB, the width of recording tracks is required to be 12 µm or less on calculation. The width of reproducing tracks is determined taken into account the resultant output and the off-track margin. The value of (the recording track width–the reproducing track width) is expected to decrease to 5 µm or less from the current 12 µm. If so, the width of the off-track margin is severely restricted. For example, on condition that the recording track width is 12 µm and that the reproducing track width is 10 µm, the value of (the recording track width–the reproducing track width) is 2 µm as the sum of both side margins and 1 µm as one side margin. Thus, the off-track margins between the magnetic tape and the apparatus are as narrow as 0.5 µm, respectively. In such a case, the amount of edge weave is preferably smaller than 0.8 µm, more preferably smaller than 0.6 µm, and zero as the best.

To correctly trace tracks in correspondence with track pitches which have become narrower and narrower, it is necessary that the spacing dimensions between the tape edge and data tracks, the tape edge and servo tracks and the servo track and data tracks should be kept constant against changes in temperature and humidity, in other words, that the temperature and humidity expansion coefficients in the tape widthwise direction should be small. The temperature expansion coefficient in the tape widthwise direction is preferably 0 to $8\times10^{-6}/°C.$, more preferably 0 to $6\times10^{-6}/°C.$, and the humidity expansion coefficient in the tape widthwise direction is preferably 0 to $10\times10^{-6}/\%RH$, more preferably 0 to $8\times10^{-6}/\%RH$, and zero as the best.

As the track pitches become narrower, the non-uniformity of the thickness of a magnetic coating layer gives a more serious influence on output and causes a larger fluctuation in output. This leads to a higher error rate. In case of a magnetic medium in which a non-magnetic primer layer and a magnetic layer are applied on a non-magnetic support while the non-magnetic primer layer is being wet, a disorder is likely to occur at the interface between the non-magnetic primer layer and the magnetic layer in the coating step, the orientation step in a magnetic field, and the drying step. Such a disorder at the interface becomes a serious factor to vary the thickness of the magnetic layer. The methods of decreasing variation in the thickness of magnetic layers are disclosed in JP-A-5-73883, JP-A-10-69635, JP-A-2001-134919, JP-A-2001-256633, etc. Some of these publications describe that a magnetic layer is applied after drying a non-magnetic primer layer. Other publications describe that a non-magnetic coating paint and a magnetic coating paint are made thixotorpic so that their thixotropies could be close to each other, or that needle particle type filler is contained in a non-magnetic coating paint. However, the method of applying the magnetic layer after drying the non-magnetic primer layer is difficult to regulate the thickness of the magnetic layer to 0.09 µm or less, preferably 0.06 µm or less, more preferably 0.04 µm or less. The method of preparing the non-magnetic coating paint and the magnetic coating paint thixotropic so that their thixotropies can be close to each other, and the method of containing the needle particle type filler in the non-magnetic coating paint are found to have the following problems. In case where the thickness of the magnetic layer is 1 µm or less, the ratio of the variation amount of the thickness of the coating layer ($\Delta d$) to the thickness of the coating layer (d) is 0.5 or less, and the ratio of the standard deviation of the amount of variation of the thickness of the coating layer (STDEV$\Delta d$) to the thickness of the coating layer (d) is 0.2 or less. In case where the thickness of the magnetic layer is 0.01 to 0.3 µm, the ratio of the standard deviation of the amount of variation of the thickness of the coating layer (STDEV$\Delta d$) to the thickness of the coating layer (d) is 0.5 or less. As a magnetic layer is formed far thinner, the variation rate (%) (=the amount of variation in the thickness of the coating layer (Δd)/the thickness of the coating layer (d)×100) becomes far larger, even if the variation amount of the thickness is the same. Therefore, the uniformity in the thickness of a magnetic layer should be achieved in order to realize a magnetic tape comprising a magnetic layer with a thickness of 0.09 µm or less, preferably 0.06 µm or less, more preferably 0.04 µm or less as in the present invention, as will be described later.

SUMMARY OF THE INVENTION

An object of the present invention is to provide a breakthrough technique for overcoming the foregoing problems, and thus to provide a magnetic tape having a high recording density capable of corresponding to a recording capacity of 1 TB or more per one reel of tape, and a magnetic tape cartridge comprising the same.

To achieve the above object, the characteristics of magnetic powder necessary for markedly increasing the recording density of a coating type magnetic recording medium which comprises a thin magnetic layer are described in the following items (1) to (5), and raw materials and a production process suitable for such a magnetic recording medium have been researched and developed under these basic guides (1) to (5).

(1) Magnetic powder having a coercive force as high as possible, to an extent that the deletion of records with a magnetic head is possible.

(2) Magnetic powder showing as large saturation magnetization as possible, and comprising, as main components, elements which are abundantly present as resources.

(3) Magnetic powder having a particle shape of a plate, grain or ellipsoid which has good filling properties.

(4) Magnetic powder comprising as fine particles as possible, to an extent that the magnetic powder can maintain saturation magnetization.

(5) Magnetic powder having an uniaxially magnetic anisotropy in which the magnetization is easy in a single direction.

The present inventors have researched magnetic powder which can satisfy all the above properties, and found that magnetic powder having a particle diameter of 5 to 50 nm (preferably 5 to 30 nm, more preferably 5 to 25 nm) and a particle shape of a plate, grain or ellipsoid can satisfy these properties and can provide an excellent recording medium with a high density. Examples of such magnetic powder are magnetic powder of barium ferrite and magnetic powder of rare earth-iron-boron type. It is demonstrated that a magnetic recording medium using the rare earth-iron-boron magnetic powder can readily possess a high coercive force and provide a high magnetic flux density, although this magnetic powder comprises ultrafine granular or ellipsoidal particles.

Based on this finding, the present invention provides a magnetic tape comprising a non-magnetic support, a magnetic layer containing magnetic powder which is formed on one side of the non-magnetic support, a primer layer containing non-magnetic powder which is formed between the non-magnetic support and the magnetic layer, and a backcoat layer containing non-magnetic powder which is formed on the other side of the non-magnetic support. This magnetic tape is provided as follows. The magnetic powder used comprises plate, granular or ellipsoidal particles with a particle diameter of 5 to 50 nm, preferably 5 to 30 nm, more preferably 5 to 25 nm, and the thickness of the magnetic layer containing this magnetic powder is adjusted to 0.09 µm or less. At least one of the primer layer and the backcoat layer contains non-magnetic plate particles with a particle diameter (along the plate face direction) of 10 to 100 nm.

In this regard, the particle diameter of magnetic particles and the particle diameter of non-magnetic plate particles referred to in the context of the present specification (hereinafter referred to as number-average particle diameter, average particle diameter or average particle size) are determined by actually measuring the particle sizes of 500 particles shown on a photograph which was taken at a magnification of 250,000 with a transmission electron microscope (or TEM) and averaging the resultant 500 particle sizes.

The magnetic tape which uses such magnetic powder comprising plate, granular or ellipsoidal particles with a very fine particle size shows less magnetic interaction between each of the magnetic particles, and thus permits a rapid magnetic inversion and a narrower magnetic inversion region. Therefore, it is found that this magnetic tape can obtain more excellent recording characteristics than a conventional magnetic tape which uses magnetic powder comprising needle particles. The magnetic recording medium according to the present invention exhibits its effect particularly when the thickness of the magnetic layer is as thin as 0.09 µm or less. A recording medium having such a thin magnetic layer shows less influence of demagnetization due to a demagnetizing field, and the resultant medium is found to show superior recording characteristics.

Examples of the magnetic powder having the above specified structure, that is, comprising ultrafine plate, granular or ellipsoidal particles, include barium ferrite magnetic powder and rare earth-iron-boron magnetic powder, as mentioned above. Of these types of magnetic powder, the rare earth-iron-boron magnetic powder, which can readily possess a higher coercive force and provide a higher magnetic flux density, will be described in detail as a typical example thereof.

Also, the present inventors have intensively researched the formation of a thinner primer layer. As a result, they have found that a primer layer can have an uniform thickness and a good surface smoothness by containing non-magnetic plate particles with a particle diameter (along the plate face) of 10 to 100 nm in the primer layer. In addition, it is also found that the non-uniformity in the thickness of the magnetic layer is suppressed, since the disorder of the interface between the primer layer and the magnetic layer is reduced.

To obtain the dimensional stability of the magnetic tape against changes in temperature and humidity, non-magnetic plate particles with a particle diameter of 10 to 100 nm are contained in the primer layer, and/or non-magnetic plate particles with a particle diameter (along the plate face) of 10 to 100 nm are contained in the backcoat layer. By doing so, the superposition of the non-magnetic plate particles suppresses the temperature/humidity expansion of a binder resin in the tape in-plane direction (the lengthwise direction and the widthwise direction of the tape), and thus significantly improves the dimensional stability in the tape widthwise direction against changes in temperature and humidity, which is one of the problems of the present invention to be solved.

Further, by containing the non-magnetic plate particles, variation in the thickness of (the magnetic layer+the primer layer) and variation in the thickness of the backcoat layer are lessened to thereby reduce the deformation of a magnetic sheet wound up (the formation of raised stripes, and dislocation of the edges of a wound tape), and thus, it is found that edge weaves caused on the edges of tape when the magnetic sheet is slit into tapes is reduced.

Magnetic tapes according to the second to fourth embodiments of the present invention can be suitably accomplished by employing the foregoing structures of the magnetic powder, the magnetic layer and the non-magnetic plate particles, although employment of structures other than the above structures are not inhibited.

A magnetic tape according to the second embodiment comprises a non-magnetic support, a magnetic layer containing magnetic powder which is formed on one side of the non-magnetic support, a primer layer containing non-magnetic powder which is formed between the non-magnetic support and the magnetic layer, and a backcoat layer containing non-magnetic powder which is formed on the other side of the non-magnetic support, which has a width of the recording track of 12 μm or less, and is used at a running speed of 4 m/sec. or higher, characterized in that the temperature expansion coefficient in the tape widthwise direction is 0 to $8 \times 10^{-6}$/° C., and the humidity expansion coefficient, 0 to $10 \times 10^{-6}$/%RH; and the amount of edge weave present on either of the edges of the tape as the reference side for the running of the tape is less than 0.8 μm.

A magnetic tape according to the third embodiment comprises a non-magnetic support, a magnetic layer which containing magnetic powder which is formed on one side of the non-magnetic support, a primer layer containing non-magnetic powder which is formed between the non-magnetic support and the magnetic layer, and a backcoat layer containing non-magnetic powder which is formed on the other side of the non-magnetic support, characterized in that the thickness of the magnetic layer is 0.05 μm to 0.09 μm; and the rate of fluctuation in reproducing output in at least one of the tape lengthwise direction and the tape widthwise direction is 8% or less when signals with a wavelength of 2 μm are recorded on the magnetic tape with a magnetic induction type recording head having a recording track width of 76 μm and are reproduced with a magnetoresistance type reproducing head having a track width of 38 μm (the thickness of a magnetoresistance type element: 0.05 μm).

Finally, a magnetic tape according to the fourth embodiment is characterized in that the thickness of the magnetic layer is 0.01 μm to less than 0.05 μm; and the rate of fluctuation in reproducing output in at least one of the tape lengthwise direction and the tape widthwise direction is 10% or less when signals with a wavelength of 2 μm are recorded on the magnetic tape with a magnetic induction type recording head having a recording track width of 76 μm and are reproduced with a magnetoresistance type reproducing head having a track width of 38 μm (the thickness of a magnetoresistance type element: 0.05 μm).

DETAILED DESCRIPTION OF THE INVENTION

Figure 1:
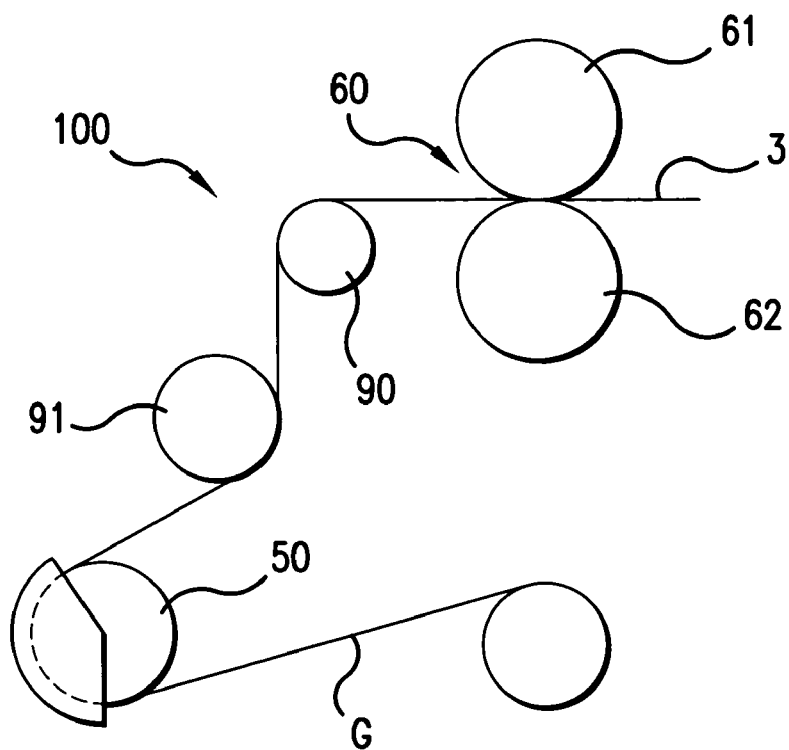
FIG. 1 is a schematic diagram of the arrangement of a whole of a slitting machine used for making magnetic tapes.

Magnetic powder comprising needle particles of an iron-cobalt alloy, which is conventionally used in magnetic recording media such as coating type high density magnetic tapes, has a theoretical limit in the value of coercive force as the property (1), and also has a problem in the particle size as the property (4), since it becomes very difficult to uniformly disperse this magnetic powder if the powder is further reduced in particle size. However, the most serious problem is that it is essentially impossible to realize the properties (3) and (5) at the same time, because the coercive force is induced by the shape magnetic anisotropy due to the particle shape of needle, so that the an aspect is decreased to about 5 as the smallest. If this ratio is below about 5, the uniaxial anisotropy of the powder lowers, resulting in a smaller coercive force.

The present inventors have synthesized a variety of magnetic powder with taking into consideration the above essential properties in order to improve the magnetic characteristics from the viewpoints different from the conventional magnetic powder based on the shape magnetic anisotropy. As a result of the examination of the magnetic anisotropy of the resultant magnetic powder, they have found that a rare earth-iron-boron type magnetic material, which comprises at least a rare earth, iron and boron as constitutive elements, has a large crystalline magnetic anisotropy, and therefore is not needed to be formed into needle particles. It is therefore known that this magnetic powder, even if comprising granular or ellipsoidal particles, can show a large coercive force in a single direction. The magnetic ellipsoidal particles referred to in the present invention mean that the ratio of the major axis to the minor axis of an ellipsoidal particle is 2 or less, and this shape of the particles is essentially different from the particle shapes of the conventional magnetic powder for use in magnetic recording media.

The rare earth-iron-boron magnetic powder is generally known as a high performance magnetic material comprising particles in the order of submicron, prepared by a powder metallurgy technique. For example, a neodymium-iron-boron magnetic material for use in a permanent magnet has a composition represented by $Nd_2Fe_{14}B$, and has a very large coercive force of 800 kA/m or more. However, the coercive force of a magnetic recording medium is determined by the relationship with a recording head, and it is generally said that signals can be magnetically recorded on a magnetic recording medium having a coercive force which is up to about one sixth of the saturation magnetic flux density of a magnetic head. Therefore, this magnetic material can not be used as magnetic powder for a magnetic recording medium, because of its excessive coercive force which makes it impossible for a magnetic head to delete recorded signals.

The present inventors have discovered that, based on the foregoing properties, it is effective to decrease the amount of a rare earth element added relative to iron, as compared with that of the rare earth element for use in the above permanent magnet, and to increase the amount of boron relative to iron, in order to achieve a coercive force suitable for a magnetic recording medium. While, as the rare earth-iron-boron type magnetic material, a compound represented by $Nd_2Fe_{14}B$ as above is well known as showing a particularly high coercive force, the present inventors also have discovered that a coercive force sufficient for a magnetic recording medium can be obtained by using, as a rare earth element, samarium (Sm), terbium (Tb) or yttrium (Y) in place of Nd, in the above composition. That is, the present inventors have firstly manifested that rare earth elements other than neodymium which has attracted public attentions so far, can be used for magnetic recording media. In other words, the present inventors have paid keen attentions on the rare earth-iron-boron type magnetic materials which have been used for permanent magnets, as materials for use in magnetic recording media having a coercive force range lower than those of permanent magnets, and firstly have succeeded in putting them into practical use. Thus, they have successfully developed quite a novel field of materials.

The present inventors have advanced their researches on the rare earth-iron-boron type magnetic materials based on the above findings. As a result, they have discovered that the following rare earth-iron-boron magnetic powder can show a higher coercive force to an extent that recorded signals can be deleted by a magnetic head, and that it can impart excellent electromagnetic conversing properties to a thin layer coating type magnetic recording medium. That is, the content of a rare earth element of a rare earth-iron-boron type magnetic material is decreased as compared with the content thereof in the composition which is known as a material for a permanent magnet, and further, rare earth-iron-boron magnetic powder is prepared as follows. Each magnetic particle of magnetic powder comprises a core portion of an iron metal or an iron alloy and an outer layer portion of a rare earth-iron-boron compound, and has a particle diameter (an average particle size) of 5 to 50 nm, preferably 5 to 30 nm, more preferably 5 to 25 nm, and a shape of a grain or an ellipsoid. As the rare earth in the magnetic powder of this type, there is used at least one element selected from yttrium, ytterbium, cesium, praseodymium, samarium, lanthanum, europium, neodymium, terbium, and the like, and the use of neodymium, samarium, terbium or yttrium is effective for the magnetic powder to achieve a high coercive force.

It becomes possible for a thin layer coating type magnetic recording medium to show high coercive force and high saturation magnetization at the same time by using such a specified rare earth-iron-boron magnetic powder in the coating type magnetic recording medium. That is, since the above magnetic powder has a largely reduced content of a rare earth element, or since each magnetic particle of the above magnetic powder has a core portion of an iron metal or an iron alloy as a main component, high saturation magnetization peculiar to the iron metal or the iron alloy can be obtained. Particularly when the core portion of the magnetic particle is composed of an iron metal or an iron alloy, and specifically when the core portion is composed of an iron-cobalt alloy, the highest saturation magnetization can be obtained. The use of the iron metal or the iron alloy alone lowers the coercive force of the magnetic powder because it has no shape anisotropy. However, the addition of small amounts of a rare earth and boron thereto markedly increases the coercive force. In another case where each particle of magnetic powder has a core portion of an iron metal or an iron alloy and an outer layer portion of a rare earth-iron-boron compound which encloses the core portion, the magnetic powder as a whole can show a high coercive force since this compound has a high coercive force. In this case, the compound itself shows a relatively low saturation magnetization, while the iron metal or the iron alloy maintains high saturation magnetization. As a result, the magnetic powder can achieve both of high saturation magnetization and high coercive force at the same time.

As described above, the above specified rare earth-iron-boron magnetic powder suitably used in the present invention exhibits excellent magnetic characteristics. The reason therefore is considered that the magnetic anisotropy of the iron metal or the iron alloy is integrated with the magnetic anisotropy of the rare earth-iron-boron compound through their magnetic interaction, so that the magnetic powder behaves as if it were a single magnetic body, in spite of its particle structure having the core portion and the outer layer portion. The phenomenon of the integration of different kinds of magnetic anisotropy inside the particle because of their magnetic interaction is an innovational discovery which has not been anticipated from the common knowledge, and which has been firstly discovered by the present inventors.

The present inventors have made researches on the particle size of the above rare earth-iron-boron magnetic powder. As a result, they have found that a magnetic layer can achieve excellent magnetic characteristics on condition that the particle diameter (the average particle size) of the magnetic powder is 5 to 50 nm, preferably 5 to 30 nm, more preferably 5 to 25 nm. The conventional magnetic powder of the needle particle type is required to have an average particle size of about 100 nm as the smallest in order to maintain a high coercive force. On the other hand, the coercive force of the above magnetic powder suitably used in the present invention originates mainly from the anisotropy of the crystals, and therefore, the magnetic powder can comprise very fine particles with an average particle size of up to 5 nm, and each of such very fine particles can exhibit excellent magnetic characteristics. The average particle size is more preferably 8 nm or more, particularly 10 nm or more.

If the particle diameter (or the average particle size) of the above magnetic powder is too large, the amount of the magnetic powder to be contained in the magnetic layer decreases, and also, the surface smoothness of the magnetic layer is impaired, if the layer is formed with a thin thickness. Furthermore, particle noises due to the size of the particles in the resultant magnetic recording medium become larger. Therefore, the average particle size of the magnetic powder should be 50 nm or less, preferably 30 nm or less, more preferably 25 nm or less. The magnetic powder with a particle size as selected above can have a very high content of the powder and thus can achieve excellent saturation magnetic flux density.

The iron metal or the iron alloy in the above rare earth-iron-boron magnetic powder suitably used in the present invention contributes to high saturation magnetization. In case of the use of the iron alloy, a transition metal such as Mn, Zn, Ni, Cu, Co or the like is used as an alloying metal. Among these transition metals, Co and Ni are preferable, and Co is particularly preferable because it contributes the most to the improvement of saturation magnetization. The amount of a transition metal as above is preferably 5 to 50 atomic %, more preferably 10 to 30 atomic % based on iron.

The amount of the rare earth in the rare earth-iron-boron compound is 0.2 to 20 atomic %, preferably 0.3 to 15 atomic %, more preferably 0.5 to 10 atomic %, based on the amount of the iron. The amount of the boron in the whole of the magnetic powder is 0.5 to 30 atomic %, preferably 1 to 25 atomic %, more preferably 2 to 20 atomic % based on the amount of the iron. These atomic percentages are determined by fluorescent X-ray analyses. The compounding of the above-specified amounts of the rare earth and the boron integrally enhances the bond in the particle because of the magnetic interaction of the different kinds of magnetic anisotropy. As a result, a coercive force of 80 to 400 kA/m which is optimal for magnetic powder for use in a high performance magnetic recording medium can be obtained.

Next, the particle shape of the above rare earth-iron-boron magnetic powder will be described from the viewpoint of the dispersibility of a paint for magnetic layer and the properties for forming a thin magnetic layer.

In the conventional magnetic powder of the needle particle type, the particle size thereof is reduced so as to improve the recording characteristics such as reduction of noises. The specific surface area of the magnetic powder consequently increases, so that the interaction between the magnetic powder and a binder resin becomes larger, which makes it difficult to obtain a homogenous dispersion when the magnetic powder is dispersed in the binder resin. In addition, when the dispersion is diluted with a large amount of an organic solvent so as to form a thin coating layer, the magnetic powder tends to agglomerate, so that the orientation and the surface smoothness of the resultant coating layer degrade. From this point of view, there is a limit in the particle size of magnetic powder usable in a coating type magnetic recording medium.

By contrast, the rare earth-iron-boron magnetic powder suitably used in the present invention has a particle shape of a grain or an ellipsoid, and therefore, it is possible to form particles in the shape of substantial sphere which minimizes the specific surface area of the magnetic powder. Therefore, the interaction between the magnetic powder and a binder resin is smaller, as compared with the conventional magnetic powder, which leads to an improved flowability of a paint for magnetic layer. Accordingly, the dispersion of the magnetic powder, even if having some agglomeration, becomes easy. Thus, this magnetic powder can be used to prepare a paint for magnetic layer particularly suitable for forming a magnetic layer by applying with a thin thickness. As a result, magnetic powder with a particle size of so small as about 5 nm as mentioned above is sufficient for practical use in a magnetic recording medium.

As mentioned above, to avoid the influence of a decrease in output due to demagnetization in the course of recording and reproducing, which is the essential problem of the lengthwise recording, it is effective to decrease the thickness of the magnetic layer. However, there is a limit in the thickness of the magnetic layer, insofar as magnetic powder of needle particle type with a particle size of about 100 nm is used. This is described below. The needle particles of magnetic powder are generally arrayed so that the needle-pointed direction can be in parallel to the in-plane direction of a recording medium due to the magnetic orientation. However, this magnetic orientation has a distribution, so that some of the particles are so distributed that their needle-pointed direction can be perpendicular to the surface of the medium. Such needle particles project from the surface of the magnetic layer to impair the surface smoothness of the medium and to thereby markedly increase the noises. This problem becomes more and more serious, as the thickness of the magnetic layer becomes more and more thinner. Therefore, in the state of the art, it is difficult to form a coating magnetic layer having a thickness of about 0.09 µm or less and also a smooth surface, insofar as the needle particle type magnetic powder is used.

In case where a primer layer is formed between a non-magnetic support and a magnetic layer so as to form the magnetic layer with a thinner thickness, and where the simultaneous superposing type coating method in which a paint for magnetic layer containing the needle particle type magnetic powder is applied on the primer layer in a wet state is employed, the magnetic powder is drawn into the primer layer, so that the needle magnetic particles of the magnetic powder tend to project into the primer layer at the interface on the magnetic layer to thereby further disturb the orientation of the magnetic layer. Therefore, a desired squareness ratio can not be obtained, and also, the smoothness of the surface of the magnetic layer tends to degrade. It is considered that this problem may constitute one of factors to make it hard for a thin magnetic layer containing the needle particle type magnetic powder to achieve a high density.

By contrast, the rare earth-iron-boron magnetic powder suitably used in the present invention has not only a smaller particle size but also a particle shape of a grain or an ellipsoid which can take a shape of substantial sphere. Therefore, the magnetic particles of this magnetic powder do not project from the surface of the magnetic layer, nor project into the primer layer, like the needle particle type magnetic powder.

Thus, the surface smoothness of the resultant magnetic layer is very good. In the meantime, the output decreases as the thickness of the magnetic layer is reduced, because the magnetic flux from the magnetic layer lessens. However, the magnetic powder used in the present invention has a great advantage to overcome this problem, because of having a particle shape of a grain or an ellipsoid which can take a shape of substantial sphere. Thus, the magnetic powder used in the present invention can be packed in the magnetic layer at a higher content as compared with the needle particle type magnetic powder. As a result, the magnetic layer of the present invention can obtain a higher magnetic flux density.

Next, the saturation magnetization of the magnetic powder used in the present invention will be described. Magnetic powder of a metal or an alloy generally tends to have a larger specific surface area, as the particle size thereof becomes smaller, so that the ratio of the oxidized surface of the layer which does not contribute to saturation magnetization becomes larger, and that the magnetic portion which contributes to the saturation magnetization becomes smaller. In other words, as the particle size of the magnetic powder becomes smaller, saturation magnetization becomes smaller. This tendency is especially remarkable in the needle particle type magnetic powder, in which the saturation magnetization abruptly decreases when the major axis is around 100 nm. Such a decrease in saturation magnetization is one of the factors to determine the limit of the usable particle size.

By contrast, the rare earth-iron-boron magnetic powder used in the present invention has a particle shape of a grain or an ellipsoid, the specific surface area of this magnetic powder becomes minimum, when compared with other magnetic powder based on the same volume. Therefore, this magnetic powder, in spite of comprising very fine particles, can maintain high saturation magnetization.

The wording of the particle shape of "a grain or an ellipsoid" of the rare earth-iron-boron magnetic powder suitably used in the present invention means that the shapes of the particles of the magnetic powder include all the shapes from a substantially granular shape to an ellipsoidal shape (including medium shapes between the granular shape and the ellipsoidal shape), and the particle shape of the present invention may be any one selected therefrom. In other words, this wording is used to exclude "the needle particle type" conventional magnetic powder. Among the above particle shapes, the spherical or ellipsoidal particles are preferable, because the specific surface area of the magnetic powder becomes the smallest. These particle shapes can be observed with a transmission type electronic microscope, as well as the particle size.

As described above, the rare earth-iron-boron magnetic powder is essentially suitable for obtaining a thin magnetic layer, in all the terms of saturation magnetization, coercive force, particle size, and particle shape. When this magnetic powder is used to make a magnetic recording medium having a magnetic layer with an average thickness of 0.09 µm or less (particularly 0.06 µm or less), especially excellent recording/reproducing characteristics can be obtained. It is preferable to use magnetic powder having a saturation magnetization of 80 to 200 A.m$^2$/kg (80 to 200 emu/g), in order to improve the characteristics of the high recording density region of a magnetic recording medium comprising a magnetic layer with an average thickness of 0.09 µm or less.

In the context of the present specification, the coercive force and the saturation magnetization of magnetic powder are values determined as follows: the coercive force and the saturation magnetization of a reference sample are measured with a sample-vibration type magnetometer at 25° C. under application of a magnetic field of 1,273.3 kA/m (16 kOe), and the measured values are corrected for an intended magnetic powder.

For example, the rare earth-iron-boron magnetic powder suitably used in the present invention is prepared by the following method. First, an aqueous solution which contains ions of a rare earth such as neodymium, samarium or the like, and iron ions, and if necessary, ions of a transition metal such as Mn, Zn, Ni, Cu, Co or the like is mixed with an aqueous alkaline solution to form a co-precipitate of the rare earth, the iron and the above transition metal. As the raw materials of the rare earth ions, the iron ions and the transition metal ions, iron sulfate, iron nitrate or the like is used. Next, a boron compound is added to the co-precipitate, and the mixture is heated at a temperature of 60 to 400° C. to form a boron-containing oxide of the rare earth and the iron (and optionally the above transition metal).

The above boron compound acts as a flux for growing crystals to an intended particle size while protecting the particles from excessive baking, as well as a source for supplying boron. As such a boron compound, $H_3BO_3$ or the like is preferably used, although not limited thereto. The boron compound in a solid state may be mixed with the co-precipitate. However, in order to obtain magnetic powder having good physical properties, boron is dissolved and mixed in a suspension of the co-precipitate, and the mixture is dried to remove water and treated by heating.

Next, the heat-treated product is washed with water to remove excessive boron, and dried. This product is reduced by heating at a temperature of 400 to 800° C. under a hydrogen atmosphere or the like for reduction to obtain a rare earth-iron-boron magnetic powder. Other elements may be contained in this magnetic powder to improve the anti-corrosion property, etc. Also, in this case, it is desirable that the amounts of the rare earth and the boron in a whole of the magnetic powder are 0.2 to 20 atomic % and 0.5 to 30 atomic %, based on the amount of the iron, respectively.

The magnetic powder of the present invention may be prepared by another method. First, an aqueous solution which contains iron ions, and if necessary, ions of a transition metal such as Mn, Zn, Ni, Cu, Co or the like is mixed with an aqueous alkaline solution to form a co-precipitate of the iron and optionally the above transition metal. As the raw materials of the iron ions and the transition metal ions, iron sulfate, iron nitrate or the like is used. Next, a rare earth element such as neodymium, samarium or the like, and a boron compound are added to the co-precipitate, and the mixture is heated at a temperature of 60 to 400° C. to form a boron-containing oxide of the rare earth and the iron (and optionally the above transition metal). Then, the excessive boron is removed from the heat-treated product, and the product is reduced by heating under a hydrogen atmosphere as in the foregoing method to obtain the rare earth-iron-boron magnetic powder. This method is suitable for obtaining a rare earth-iron-boron magnetic powder in which each magnetic particle comprises a core portion of an iron metal or an iron alloy with the above transition metal as a main component, and an outer layer of a rare earth-iron-boron compound as a main component. Also in this method, other elements may be contained in this magnetic powder to improve the anti-corrosion property, etc. Also, in this case, it is desirable that the amounts of the rare earth and the boron in a whole of the magnetic powder are 0.2 to 20 atomic % and 0.5 to 30 atomic %, based on the amount of the iron, respectively.

In order to pack and disperse the ultrafine magnetic particles with a particle size (an average particle diameter) of 50 nm or less in a coating layer at a high density, it is preferable to prepare a paint by the following steps. Prior to the kneading step, the granular particles of magnetic powder are cracked with a cracking machine, and the cracked particles are mixed with an organic acid such as phosphoric acid, and a binder resin in a mixer, so as to treat the surfaces of the particles of the magnetic powder. In the kneading step, the treated mixture is kneaded in a continuous type twin screw kneader so that the solid content can be 80 to 85 wt. %, and that the ratio of the binder resin to the magnetic powder can be 17 to 30 wt. %. In the next step after the kneading step, the continuous twin screw kneader or other diluting machine is used to knead and dilute the knead-mixture with a binder resin solution and/or a solvent, at least one time, and the resultant paint is dispersed with a very fine media rotation type dispersing machine such as a sand mill.

Hexagonal barium ferrite powder may be contained in the magnetic layer. The coercive force of the hexagonal barium ferrite powder added is preferably 120 to 320 kA/mm, and the amount of saturation magnetization is preferably 50 to 70 $A.m^2/kg$ (50 to 70 emu/g). The magnetic characteristics of the magnetic layer and the ferromagnetic powder are measured in an external magnetic field of 1,273.3 kA/m (16 kOe) with a sample vibration type fluxmeter.

It is preferable that the hexagonal barium ferrite powder has a particle diameter (along the plate face direction) of 5 to 50 nm, more preferably 5 to 30 nm, further preferably 5 to 25 nm. If the particle diameter is less than 5 nm, the agglomerating force of the magnetic powder increases, so that the dispersion of the magnetic powder in a paint becomes difficult. On the other hand, if it exceeds 50 nm, particle noises based on the size of the particles become larger. The plate ratio (the particle diameter/the thickness of the plate) is preferably 2 to 10, more preferably 2 to 5, further preferably 2 to 4. In this regard, the particle diameter is found by actually measuring the sizes of 500 particles on a photograph which is taken with a transmission electron microscope (TEM), and averaging the 500 particle sizes. The BET specific surface area of the hexagonal barium ferrite powder is preferably 1 to 100 $m^2/g$.

Examples of the non-magnetic particles used in the primer layer include titanium oxide, iron oxide, aluminum oxide, etc., and iron oxide alone or a mixture of iron oxide and aluminum oxide is used. In general, non-magnetic iron oxide having a major axis of 0.05 to 0.2 μm and a minor axis of 5 to 200 nm is mainly used, and if necessary, carbon black having a particle diameter of 0.01 to 0.1 μm, and aluminum oxide having a particle diameter of 0.1 to 0.5 μm are auxiliarily contained in the primer layer. The non-magnetic particles and the carbon black have not so sharp particle distributions, and this defect is not so serious when the thickness of the primer layer is 1.0 μm or more. However, when the thickness of the primer layer is 1.0 μm or less, the particles on the larger particle diameter side of the particle distribution influence the surface roughness of the primer layer. For this reason, it is difficult to form a thin primer layer with a thickness of 1.0 μm or less.

To overcome this problem, the present inventors have made intensive researches for obtaining non-magnetic plate particles which are ultrafine particles having a small particle distribution and suitable for a primer layer, such as aluminum oxide particles or the like. As a result, they have succeeded in obtaining non-magnetic plate particles with a particle diameter (a number-average particle diameter) of 10 to 100 nm. The particle diameter of the non-magnetic plate particles is determined by actually measuring the particle sizes (the maximum particle diameter along the plate face direction) of 500 particles on a photograph which was taken at a magnification of 250,000 with a transmission electron microscope (TEM), and averaging them for number-average value.

The non-magnetic plate particles such as aluminum oxide plate particles or the like with a particle size of 10 to 100 nm used in the present invention have major two features. One is that, because of being ultrafine plate particles, variation in the thickness of a coating layer with a thickness as thin as 1.0 µm or less is small, so that the smoothness of the interface between such a primer layer and a magnetic layer does not degrade. The other is that a coating layer in which the plate particles are superposed on one another is formed, so that the coating layer is reinforced in the plane direction and is concurrently improved in dimensional stability against changes in temperature and humidity.

For example, aluminum oxide particles are produced by any of various known methods. In general, aluminum oxide formed by baking is pulverized in a ball mill or the like to obtain fine particles thereof. The aluminum oxide particles provided by this method, however, have a wide particle size distribution, and the particle size is in the order of submicron as the smallest because of the mechanical pulverization, so that it is hard to obtain further fine particles of aluminum oxide.

A precipitate of aluminum hydroxide is formed by neutralization, and this aluminum hydroxide is heated in an air to obtain aluminum oxide particles. This method makes it possible to obtain aluminum oxide particles with a small particle diameter. However, the shapes of the resultant particles are irregular, which makes it impossible to impart, to a layer containing the particles, surface smoothness, reinforcement, dimensional stability against changes in temperature and humidity, etc. In addition, there arises a tendency to form secondary particles due to the inter-particle agglomeration. Therefore, a large energy and very long time are required to obtain an uniform dispersion.

For example, JP-A-7-315833 describes that plate-shaped alumina formed by baking is pulverized with a non-metallic medium for long time, so as to destruct the agglomeration of the particles. This method has a limit in the size of the resultant very fine particles, since the particles are provided by pulverization, and consequently, the resultant particles have a wide particle size distribution.

On the other hand, the method of forming a plate-shaped alumina through a hydrothermal synthesis has long been known. For example, JP-B-37-7750 and JP-B-39-13465 describe that the particle diameters of plate-shaped alumina obtained are in the order of several microns to several hundred microns, which has a problem in view of formation of very fine particles.

Otherwise, aluminum hydroxide particles, the sizes of which have been previously regulated in the order of submicron, are subjected to a hydrothermal treatment at a high temperature of 350° C. or more in water or an aqueous alkaline solution to obtain aluminum oxide plate particles in the order of submicron (for example, JP-A-5-17132 and JP-A-6-316413). This method makes use of a hydrothermal reaction which makes it easy to form plate-shaped aluminum excellent in crystallinity, so as to cause crystal modification for transforming aluminum hydroxide into aluminum oxide. Therefore, this reaction is carried out at a high temperature, and thus requires a special reaction vessel capable of withstanding under a high pressure. This method is considered to be suitable for producing aluminum oxide particles with a large particle diameter in the order of submicron because of making use of a hydrothermal reaction under a high temperature atmosphere, but unsuitable for producing very fine aluminum oxide particles with a small particle diameter of 100 nm or less.

As described above, despite the many demands for very fine aluminum oxide particles with a good crystallinity and a particle diameter of 100 nm or less and showing a sharp particle diameter distribution, aluminum oxide particles capable of satisfying the above requirements have not yet been developed.

The present inventors have newly developed very fine non-magnetic plate particles such as plate-shaped aluminum oxide particles, which satisfy the above requirements, and found out that the use of this non-magnetic plate particles for a primer layer makes it possible to reduce a variation in the thickness of a thin coating layer, and to improve the smoothness of the interface between a primer layer and a magnetic layer, the strength of a coating layer in the plane face direction, dimensional stability against changes in temperature and humidity, etc. In addition, similar effects (a decrease in variation in thickness, and improvement on surface smoothness, strength of a coating layer in the plane face direction, dimensional stability against changes in temperature and humidity, etc.) are also observed in a magnetic layer and a backcoat layer. Accordingly, the addition of such non-magnetic plate particles to a magnetic layer and a backcoat layer is effective to provide a magnetic tape which has very small variation in the thickness, a smooth surface, an improved strength, and high dimensional stability against changes in temperature and humidity, even though the magnetic tape has a magnetic layer with a thickness of 0.09 µm or less, preferably 0.06 µm or less, as in the present invention.

The variation in the thickness of a magnetic layer is measured by taking a photograph of the sliced section of a magnetic tape at a magnification of 10,000 to 100,000 with a transmission electron microscope (TEM) and measuring a plurality of points on the sliced section to determine the variation in the thickness of the magnetic layer, as disclosed in JP-A-2001-134919 and JP-A-2001-256633. This method, however, has the following problems. When the magnetic tape is sliced, the coating layer dislocates; it is difficult to obtain a correct variation in the thickness of the magnetic layer due to the presence of disturbed portions on the interface between a primer layer and the magnetic layer; and the points to be measured are limited to a part of the tape, in case of the measurement with an electronic microscope.

The present inventors have examined these problems and made the following trial in order to solve the problems. Signals with wavelengths long enough to the thickness of a magnetic coating layer are recorded on a magnetic tape to make magnetic record in the entire thickness of the magnetic layer, and fluctuations in the signal outputs are read to thereby take the thickness data as fluctuations in outputs. The above signals with wavelengths long enough to the thickness of the magnetic coating layer (for example, 10 times longer than the thickness of the layer) are saturation-recorded on the magnetic coating layer, and therefore, the signal outputs are proportional to the thickness of the coating layer. As a result of comparison between this measuring method and the conventional method of measuring the section of a tape on a photograph, a correlation is found between the fluctuation in the signal outputs and the variation in the thickness of the magnetic layer. Further, the data of fluctuation in signal outputs obtained by reading the fluctuation in the signal outputs from 50 m length of a magnetic tape at relatively narrow pitches (2.54 mm pitches along the tape lengthwise direction) also have a correlation with data obtained by reading them from a whole length of the magnetic tape in a tape cartridge at relatively wide pitches (25.4 mm pitches along the tape lengthwise direction). Then, fluctuation in signal outputs are read from 50 m length of the magnetic tape at 2.54 mm pitches along the tape lengthwise direction, and the resultant values are used as indexes for the variation in the thickness of the magnetic layer. In this measuring method, the position of a head is shifted in the widthwise direction to make similar measurement in the same manner. By doing so, data of fluctuation in outputs from different widthwise positions (variation in thickness) can be obtained.

Here, the newly developed method for producing non-magnetic plate particles, as mentioned above, will be described by making reference to aluminum oxide particles as an example.

To obtain aluminum oxide particles suitable for a primer layer, in the first step, an aqueous solution of aluminum salt is added to an aqueous alkaline solution containing oxy alkali amine, and the resultant hydroxide or hydrate of aluminum is subjected to a hydrothermal treatment by heating it at a temperature of 110 to 300° C. in the presence of water, so as to regulate the resultant particles to an intended shape and an intended particle diameter.

The problem of this step rests in the peculiar property of the hydroxide or hydrate of aluminum that the hydroxide or hydrate of aluminum can be dissolved both in an alkaline solution and an acidic solution, and forms its precipitate only at or around neutral pH. However, to obtain particles of a hydroxide or a hydrate of aluminum having an intended shape and an intended particle diameter through a hydrothermal reaction, it is needed to use an alkaline solution. The present inventors have intensively studied in order to overcome the problem of the peculiar property of the hydroxide or hydrate of aluminum which has a trade-off relationship. As a result, they have discovered that the intended reaction can proceed only at or around pH 10.

Next, in the second step, the above hydroxide or hydrate of aluminum is heated in an air. By doing so, there can be obtained plate-shaped aluminum oxide particles with good crystallinity which show an uniform particle diameter distribution and which is hardly sintered or agglomerated.

Thus, quite a novel conception for the production of aluminum oxide particles which comprises separate steps is provided: that is, a step for regulating the shape and particle diameter of the particles is carried out separately from a step for fully extracting the inherent physical properties of a material. Based on this novel conception, the present inventors have succeeded in the development of plate-shaped aluminum oxide particles with a particle diameter (an average particle diameter) of 10 to 100 nm which any of the conventional processes has never achieved. The term "plate-shaped" referred to herein means a shape having a plate ratio (the maximal diameter/the thickness) of exceeding 2. Preferably, this plate ratio is 100 or less, more preferably 3 to 50, further preferably 4 to 30, and most preferably 5 to 10. If the plate ratio is 2 or less, some of the particles are raised from the surface of a coating layer, in case of using a primer layer, so that the surface smoothness of the coating layer is impaired, while, if it exceeds 100, some of the particles are crushed during the preparation of a paint by using the same.

This novel process comprising the separate steps as mentioned above can be applied not only to aluminum oxide particles but also to the particles of oxides or compounded oxides of rare earth elements such as cerium, elements such as zirconium, silicon, titanium, manganese, iron and the like, or their mixed crystals, which have a particle diameter (number-average particle diameter) of 5 to 100 nm.

The product of the residual magnetic flux density and the thickness of a magnetic layer in the tape lengthwise direction is preferably 0.0018 to 0.05 µTm, more preferably 0.0036 to 0.05 µTm, further preferably 0.004 to 0.05 µTm. If this product is less than 0.0018 µTm, the reproducing output with a MR head is poor, while, if it exceeds 0.05 µTm, the reproducing output tends to skew. The use of a magnetic recording medium having such a magnetic layer advantageously makes it possible to shorten the recording wavelength, to increase the reproducing output with a MR head, to suppress the skew of the reproducing output and to increase the ratio of output to noises.

It has already been described that the dimensional stability of a magnetic tape against changes in temperature and humidity can be improved and the edge weave amount of the tape can be decreased by containing plate particles with a particle diameter (number-average particle diameter) of 10 to 100 nm in a primer layer and/or a backcoat layer. The present inventors have further examined a slitting machine (100) shown in FIG. 1, which is used as a means for slitting a magnetic sheet into a plurality of magnetic tapes with a predetermined width, and succeeded in decreasing the edge weave amounts of the magnetic tapes.

They have investigated causes for forming, on a magnetic tape, an edge weave with a short cycle (e.g., 50 mm or less) which is enough to cause off-track at a tape-feeding rate of about 4 m/sec. As a result, they have discovered that the edge weave is caused in the magnetic tape by a short cycled fluctuation in the tension of the tape induced by the fluttering of the magnetic sheet G which is being slit. Based on this finding, they have improved the components constructing the slitting machine. Specifically, the slitting machine (100) shown in FIG. 1 is improved in the tension cut roller (50) which is arranged in the web route from a position for drawing out the magnetic sheet to the slit cutter group (61, 62) of the cutter-driving section (60); the timing belt coupling (not shown) for transmitting power to the cutter-driving section (60); and reduction of the mechanical vibration of the cutter-driving section (60). In FIG. 1, numerals 90 and 91 refer to guides arranged along the feeding route for the magnetic sheet G.

Figure 2:
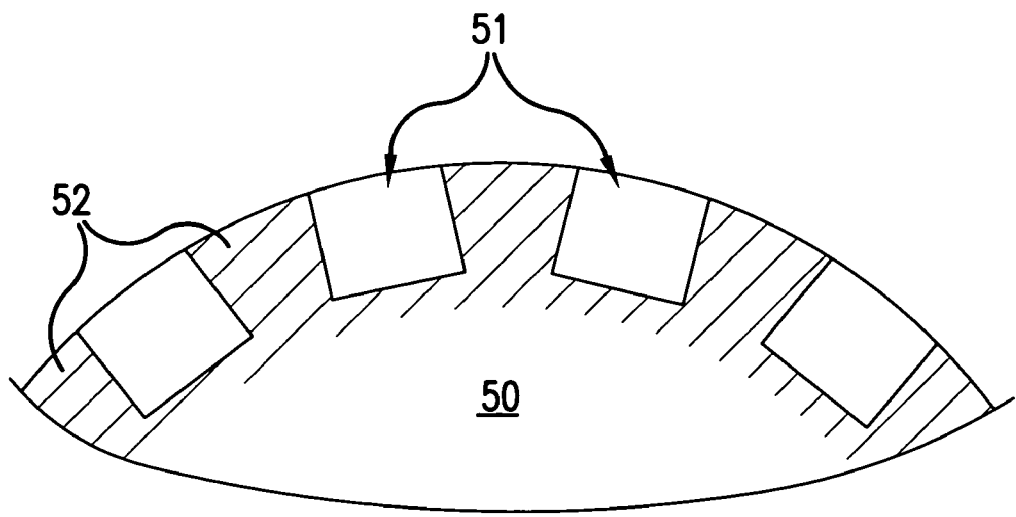
FIG. 2 is an enlarged partial sectional view of a suction roller in the slitting machine shown in FIG. 1.

As a result of the above improvements, the amount of edge weave with a short cycle (cycle f=50 mm or less) formed on either of the edges of the slit magnetic tape (3) can be largely reduced. In the above improvements, the most effective is the use of a mesh suction roller in which the suction holes (51) of the suction roller, which is the tension cut roller (50) used for controlling the tension of the magnetic sheet is formed with a porous material, as shown in FIG. 2. The use of this mesh suction roller is effective to prevent dislocation in the tape widthwise direction due to the edge weave with a short cycle. The suction roller section shown in FIG. 2 has suction holes (51) which are communicated with a suction source to suck the magnetic sheet, and tape-contacting portions (52) on the outer circumferential surface to contact the magnetic sheet thereon. The suction holes (51) and the tape-contacting portions (52) are arranged alternately at regular intervals along the outer circumferential surface of the tension cut roller (50).

A cause for forming an edge weave with a cycle (e.g., 60 to 70 mm) which tends to induce off-track at a tape-feeding rate of about 6 m/sec. was investigated. As a result, it is found that the timing belt for transmitting power to the cutter-driving section and the coupling have caused such an edge weave. Thus, by using a flat belt in place of the timing belt, and a rubber coupling in place of the metal coupling, an edge weave with a medium cycle could be largely reduced.

Further, a method for reducing an edge weave with a relatively long cycle has been investigated. As a result, it is known that the edge weave amount could be extremely small by directly driving the cutter-driving section from a motor without using a power-transmitting device.

Further, researches have been made on a method for elongating the cycle of an edge weave to, for example, 100 mm or more, within which range, off-track is not caused even at a high tape-feeding rate of 8 m/sec. or more. As a result, it is known that, by increasing the slitting speed, the cycle f can be elongated in accordance with the ratio of the slitting speed, which leads to less influence on the off-track, although the edge weave amount is hardly changed.

Next, the components of a magnetic tape according to the present invention will be described in detail.

<Non-Magnetic Support>

The thickness of a non-magnetic support is generally 2 to 5 μm, preferably 2.5 to 4.5 μm, which may vary in accordance with an end use. When the thickness of the non-magnetic support is less than 2 μm, it is difficult to form a film, and the strength of the resultant magnetic tape tends to lower. When the thickness of the non-magnetic support exceeds 5 μm, the total thickness of the magnetic tape increases so that the recording capacity per reel decreases.

The Young's modulus of the non-magnetic support in the lengthwise direction is preferably at least 9.8 GPa (1,000 kg/mm$^2$), more preferably at least 10.8 GPa (1,100 kg/mm$^2$). When the Young's modulus of the support is less than 9.8 GPa (1,000 kg/mm$^2$), the travelling feeding of the magnetic tape may become unstable. In case of a helical scan type magnetic tape, the ratio of the Young's modulus in the lengthwise direction (MD) to the Young's modulus in the widthwise direction (TD) is preferably 0.60 to 0.80, more preferably 0.65 to 0.75. When this ratio is less than 0.60 or when it exceeds 0.80, fluctuation in output from the region between the entrance to a track for a magnetic head and the exit from the track therefore (flatness) becomes larger. The flatness becomes minimum when the MD/TD ratio is at or around 0.70. Further, in case of a linear recording type magnetic tape, the ratio of the Young's modulus in the lengthwise direction to the Young's modulus in the widthwise direction is preferably 0.70 to 1.30. Examples of a non-magnetic support satisfying the above requirements are a biaxial oriented film of aromatic polyamide, aromatic polyimide, and the like.

<Primer Layer>

The thickness of a primer layer is preferably 0.2 to 1.0 μm, more preferably 0.8 μm or less, particularly 0.5 μm or less. When the thickness of the primer layer is less than 0.2 μm, the effect of reducing a variation in the thickness of a magnetic layer and the effect of improving the durability of the magnetic layer are poor. When the thickness of the primer layer exceeds 1.0 μm, the total thickness of a magnetic tape is too thick, so that the recording capacity per one reel of the magnetic tape decreases.

The primer layer may contain the above non-magnetic plate particles with a particle diameter of 10 to 100 nm so as to ensure the uniformity in the thickness of the layer and the surface smoothness, and to control the stiffness and the dimensional stability of the tape.

The components of the non-magnetic particles are oxides or compounded oxides of rare earth elements such as cerium, elements such as zirconium, silicon, titanium, manganese and iron, in addition to aluminum oxide. To improve the conductivity, plate-shaped ITO particles (indium tin oxide) are added. The plate-shaped ITO particles are added in an amount of 15 to 75 wt. % based on the weight of all the inorganic powder in the primer layer. Carbon such as plate-shaped graphite particles with a particle diameter of 10 to 100 nm may be used instead of the plate-shaped ITO particles. If needed, carbon black may be added, and carbon black with a particle diameter of 10 to 100 nm is preferable. Further, conventional oxide particles of iron oxide, aluminum oxide and the like may be added. In this case, it is preferable to use particles as fine as possible (e.g., 10 to 100 nm). A binder resin used in the primer layer may be the same one as used in the magnetic layer.

<Lubricant>

Preferably, the primer layer contains 0.5 to 5.0 wt. % of a higher fatty acid and 0.2 to 3.0 wt. % of a higher fatty acid ester based on the total weight of the powder components in the magnetic layer and the primer layer, because the coefficient of friction of the magnetic tape against a head can be decreased. When the amount of the higher fatty acid is less than 0.5 wt. %, the effect to decrease the coefficient of friction is insufficient. When the amount of the higher fatty acid exceeds 5.0 wt. %, the primer layer may be plasticized and thus the toughness of the primer layer may be lost. When the amount of the higher fatty acid ester is less than 0.2 wt. %, the effect to decrease the coefficient of friction is insufficient. When the amount of the higher fatty acid ester exceeds 3.0 wt. %, the amount of the higher fatty acid ester which migrates to the magnetic layer becomes too large, so that the magnetic tape may stick to the head.

It is preferable to use a fatty acid having 10 or more carbon atoms. Such a fatty acid may be a linear or branched fatty acid, or an isomer thereof such as a cis form or trans form. However, a linear fatty acid is preferable because of its excellent luburicity. Examples of such a fatty acid include lauric acid, myristic acid, stearic acid, palmitic acid, behenic acid, oleic acid, linoleic acid, etc., among which myristic acid, stearic acid and palmitic acid are preferable. The amount of the fatty acid to be added to the magnetic layer is not particularly limited, since the fatty acid migrates between the primer layer and the magnetic layer. Thus, the sum of the fatty acids added to the magnetic layer and the primer layer is adjusted to the above-specified amount. When the fatty acid is added to the primer layer, the magnetic layer may not always contain the fatty acid.

The coefficient of friction of the travelling magnetic tape can be decreased, when the magnetic layer contains 0.5 to 3.0 wt. % of a fatty acid amide and 0.2 to 3.0 wt. % of a higher fatty acid ester, based on the weight of the magnetic powder. When the amount of the fatty acid amide is less than 0.5 wt. %, the direct contact of the head and the magnetic layer at their interface tends to occur, and the sintering-preventive effect is poor. When the amount of the fatty acid amide exceeds 3.0 wt. %, the fatty acid amide may bleed out and causes a defect such as dropout.

As the fatty acid amide, fatty acid amides each having at least 10 carbon atoms such as the amides of palmitic acid, stearic acid and the like can be used.

The addition of less than 0.2 wt. % of a higher fatty acid ester is insufficient for decreasing the coefficient of friction, while the addition of 3.0 wt. % or more of a higher fatty acid ester gives an adverse influence such as adhesion of the magnetic tape to the head or the like. The intermigration of the lubricant between the magnetic layer and the primer layer is not always inhibited.

<Magnetic Layer>

The thickness of the magnetic layer is preferably from 0.01 to 0.09 μm, more preferably 0.06 μm or less, further preferably 0.04 μm or less When the thickness of the magnetic layer is less than 0.01 μm, the resultant output is poor, and it is difficult to form a uniform magnetic layer. When the thickness of the magnetic layer exceeds 0.09 μm, the resolution to recorded signals with short wavelengths degrades.

The degree of variation in the thickness of the magnetic layer is evaluated as follows. Signals with a wavelength of 2 μm are recorded on 50 m length of a magnetic tape with a magnetic induction type recording head having recording tracks with a width of 76 μm, and the recorded signals are reproduced with a magnetoresistance type reproducing head having tracks with a width of 38 μm (the thickness of a magnetoresistance element: 0.05 μm). The reproducing outputs are read at constant intervals, and the amount of fluctuation in output is measured for evaluation of the variation in the thickness of the magnetic layer. The amount of fluctuation in output in the tape lengthwise direction is defined, for example, by the following:

(1) the average value of average fluctuation rate (%)=(an absolute value of (output from each point−average output)/ the value of average output)×100", and (2) the standard deviation of output (%)=((standard deviation of outputs from all the points)/the value of average output)×100.

The degree of fluctuation in output in the widthwise direction can be similarly measured by shifting the position of a track for recording and reproducing a signal with wavelength of 2 μm in the widthwise direction. The average fluctuation rate of the output is 8% or less, preferably 6% or less in the lengthwise direction or the widthwise direction of the tape, on condition that the thickness of the magnetic layer is 0.05 to 0.09 μm; and the average fluctuation rate of the output is 10% or less, preferably 8% or less in the lengthwise direction or the widthwise direction of the tape, on condition that the thickness of the magnetic layer is 0.01 to less than 0.05 μm.

As a binder resin to be contained in the magnetic layer (or the primer layer), the following can be used: a combination of a polyurethane resin with at least one resin selected from the group consisting of a vinyl chloride resin, a vinyl chloride-vinyl acetate copolymer, a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, and cellulose resins such as nitrocellulose. Among them, a combination of a vinyl chloride-hydroxyl group-containing alkyl acrylate copolymer resin with a polyurethane resin is preferably used. Examples of the polyurethane resin include polyesterpolyurethane, polyether polyurethane, polyetherpolyesterpolyurethane, polycarbonatepolyurethane, polyestrepolycarbonatepolyurethane, etc.

Preferably, a binder resin such as a urethane resin which is a polymer having, as a functional group, —COOH, —SO$_3$M, —OSO$_3$M, —P=O(OM)$_3$, —O—P=O(OM)$_2$ [wherein M is a hydrogen atom, an alkali metal base or an amine salt], —OH, —NR$^1$R$^2$, —N$^+$R$^3$R$^4$R$^5$ [wherein R$^1$, R$^2$, R$^3$, R$^4$ and R$^4$ are, each independently the same or different, a hydrogen atom or a hydrocarbon group], or an epoxy group is used. The reason why such a binder resin is used is that the dispersibility of the magnetic powder, etc. is improved as mentioned above. When two or more resins are used in combination, it is preferable that the polarities of the functional groups of the resins are the same. In particular, the combination of resins both having —SO$_3$M groups is preferable.

Each of these binder resins is used in an amount of 7 to 50 wt. parts, preferably from 10 to 35 wt. parts, based on 100 wt. parts of the magnetic powder. In particular, the best combination as the binder resin is 5 to 30 wt. parts of a vinyl chloride-based resin and 2 to 20 wt. parts of a polyurethane resin.

It is preferable to use the binder resin in combination with a thermally curable crosslinking agent which bonds with the functional groups in the binder to crosslink the same. Preferable examples of the crosslinking agent include isocyanates such as tolylene diisocyanate, hexamethylene diisocyanate, and isophorone diisocyanate; and polyisocyanates such as reaction products of these isocyanates with compounds each having a plurality of hydroxyl groups such as trimethylolpropane, and condensation products of these isocyanates. The crosslinking agent is used usually in an amount of 1 to 30 wt. parts, preferably 5 to 20 wt. parts, based on 100 wt. parts of the binder resin. When the magnetic layer is applied on the primer layer by the wet on wet method; some of polyisocyanate is diffused and fed from a paint for the primer layer. Therefore, the magnetic layer can be cross-linked to some degree, even if polyisocyanate is not used in combination.

The magnetic layer may contain the above-mentioned non-magnetic plate particles with a particle diameter (number-average particle diameter) of 10 to 100 nm. If needed, the magnetic layer may contain a conventional abrasive. Examples of such an abrasive include α-alumina, β-alumina, silicon carbonate, chrome oxide, cerium oxide, α-iron oxide, corundum, artificial diamond, silicon nitride, silicon carbonate, titanium carbide, titanium oxide, silicon dioxide, boron nitride, and the like. Each of these abrasives with Moh's hardness of 6 or more is used alone or in combination. In case of a thin magnetic layer with a thickness of 0.01 to 0.09 μm the particle diameter (number-average particle diameter) of abrasive is preferably 10 to 150 nm. The amount of abrasive to be added is preferably 5 to 20 wt. %, more preferably 8 to 18 wt. % based on the weight of the magnetic powder.

The magnetic layer may further contain plate-shaped ITO particles which are prepared by the above-described method, plate-shaped carbon black particles, and conventional carbon black (CB) in order to improve the conductivity and the surface lubricity. Examples of such carbon black include acetylene black, furnace black, thermal black and the like. The particle diameter (number-average particle diameter) thereof is preferably 10 to 100 nm. If the particle diameter is 10 nm or less, it becomes hard to disperse carbon black. If it is 100 nm or more, it is needed to add a large amount of carbon black. In either case, the surface of the magnetic layer becomes coarse, which leads to a decrease in output. The amount of carbon black to be added is preferably 0.2 to 5 wt. %, more preferably 0.5 to 4 wt. %, based on the weight of the magnetic powder.

<Backcoat Layer>

To improve the tape-running performance, a backcoat layer may be formed on the other side of the above non-magnetic support composing the magnetic tape of the present invention (the side opposite to the side of the non-magnetic support on which the magnetic layer is formed). The thickness of the backcoat layer is preferably from 0.2 to 0.8 μm. When the thickness of the backcoat layer is less than 0.2 μm, the effect to improve the tape-running performance is insufficient. When the thickness of the backcoat layer exceeds 0.8 μm, the total thickness of the magnetic tape increases, so that the recording capacity per one reel of the tape decreases.

As carbon black (CB) to be contained in the backcoat layer, acetylene black, furnace black, thermal black and the like can be used. In general, carbon black with a small particle diameter and carbon black with a large particle diameter are used in combination. The particle diameter (number-average particle diameter) of small particle diameter carbon black is from 5 to 200 nm, preferably from 10 to 100 nm. When the particle diameter of small particle diameter carbon black is less than 5 nm, the dispersion thereof is difficult. When the particle diameter of small particle diameter carbon black exceeds 200 nm, a large amount of carbon black should be added. In either case, the surface of the backcoat layer becomes coarse and thus the surface roughness of the backcoat layer may be transferred to the reverse side of the magnetic layer (embossing).

When the large particle diameter carbon black having a particle diameter of 300 to 400 nm is used in an amount of 5 to 15 wt. % based on the weight of the small particle diameter carbon black, the surface of the backcoat is not roughened and the effect to improve the tape-running performance is increased. The total amount of the small particle diameter carbon black and the large particle diameter carbon black is preferably from 60 to 98 wt. %, more preferably from 70 to 95 wt. %, based on the weight of the inorganic powder in the backcoat layer. The center line average height Ra of the surface roughness of the backcoat layer is preferably from 3 to 8 nm, more preferably from 4 to 7 nm. The backcoat layer is generally made non-magnetic, because, if the backcoat layer has magnetism, there is a danger of disturbing the magnetic signals on the magnetic recording layer.

Further, the above non-magnetic plate particles having a particle diameter (number-average particle diameter) of 10 to 100 nm may be added to the backcoat layer in order to improve the strength and the dimensional stability against changes in temperature and humidity. The components of the non-magnetic plate particle include not only aluminum oxide but also oxides or compounded oxides of rare earth elements such as cerium, and elements such as zirconium, silicon, titanium, manganese, iron and the like. Further, the ITO plate particles (indium tin oxide) prepared by the above method, and plate carbon black particles may be added to the backcoat layer in order to improve the conductivity of the magnetic tape. The plate ITO particles and the carbon black particles are added to the backcoat layer in a total amount of 60 to 98 wt. % based on the weight of all the inorganic powder in the backcoat layer. The particle diameter (number-average particle diameter) of the carbon black particles is preferably 10 to 100 nm. If needed, iron oxide particles with a particle diameter of 0.1 to 0.6 µm may be added in an amount of 2 to 40 wt. %, preferably 5 to 30 wt. % based on the weight of all the inorganic powder in the backcoat layer.

As a binder resin to be contained in the backcoat layer, the same resins as the binder resins used in the magnetic layer and the primer layer can be used. Among those, the combination of a cellulose resin with a polyurethane resin is preferably used so as to decrease the coefficient of friction and to improve the tape-running performance.

The amount of the binder resin in the backcoat layer is usually from 40 to 150 wt. parts, preferably from 50 to 120 wt. parts, more preferably from 60 to 110 wt. parts, still more preferably from 70 to 110 wt. parts, based on 100 wt. parts of the total of the carbon black and the inorganic non-magnetic powder in the backcoat layer. When the amount of the binder resin is less than 40 wt. parts, the strength of the backcoat layer is insufficient. When the amount of the binder resin exceeds 150 wt. parts, the coefficient of friction tends to increase. Preferably, 30 to 70 wt. parts of a cellulose resin and 20 to 50 wt. parts of a polyurethane resin are used in combination. To cure the binder resin, a crosslinking agent such as a polyisocyanate compound is preferably used.

The crosslinking agent to be contained in the backcoat layer may be the same as those used in the magnetic layer and the primer layer. The amount of the crosslinking agent is usually from 10 to 50 wt. parts, preferably from 10 to 35 wt. parts, more preferably from 10 to 30 wt. parts, based on 100 wt. parts of the binder resin. When the amount of the crosslinking agent is less than 10 wt. parts, the film strength of the backcoat layer tends to decrease. When the amount of the crosslinking agent exceeds 35 wt. parts, the coefficient of dynamic friction of the backcoat layer against SUS increases.

<Organic Solvent>

Examples of organic solvents to be used in the paints for the magnetic layer, the primer layer and the backcoat layer include ketone solvents such as methyl ethyl ketone, cyclohexanone, methylisobutylketone, etc.; ether solvents such as tetrahydrofuran, dioxane, etc.; and acetate solvents such as ethyl acetate, butyl acetate, etc. Each of these solvents may be used alone or in combination, and such a solvent may be further mixed with toluene for use.

EXAMPLES

The present invention will be explained in detail by way of the following Examples, which do not limit the scope of the present invention in any way. In Examples and Comparative Examples, "parts" are "wt. parts", and "average particle diameter" is "particle diameter (number-average particle diameter)", unless otherwise specified.

Example 1

<<Synthesis of Ultrafine Magnetic Particles>>

Iron nitrate (III) (0.074 mol) and neodymium nitrate (0.002 mol) were dissolved in water (600 cc). Separately from this aqueous solution of nitrates, sodium hydroxide (0.222 mol) was dissolved in water (600 cc). To this aqueous sodium hydroxide solution, was added the aqueous nitrate solution, and the mixture was stirred for 5 minutes to form a hydroxide (co-precipitate) of iron and neodymium. The hydroxide was washed with water and filtered to collect the hydroxide. To this hydroxide (containing water), were further added water (30 cc) and boric acid ($H_3BO_3$) (0.5 mol), and the mixture was heated at 60° C. in an aqueous boric acid solution, while the hydroxide of iron and neydymium was being again dispersed. The resultant dispersion was spread onto a vat and dried at 60° C. for 4 hours to evaporate off water. Thus, a homogenous mixture of the hydroxide of iron and neodymium and boric acid was prepared.

This mixture was crushed and put into an alumina crucible. The mixture was treated by heating at 200° C. in an air for 4 hours to obtain a neodymium-iron oxide to which boron was bonded. In this reaction, boric acid acts as a source for supplying boron and also as a flux for growing crystals to an intended particle size while preventing the excessive sintering of the particles. The resultant product was washed with water to remove excessive boron. Thus, particles of neodymium-iron oxide to which boron was bonded were obtained. The oxide particles were reduced by heating at 450° C. in a hydrogen stream for 4 hours to obtain neodymium-iron-boron type magnetic powder. The resultant magnetic powder was then cooled to room temperature in the stream of a hydrogen gas, and again heated to 60° C. under an atmosphere of a mixed gas of nitrogen and oxygen, and treated for stabilization under the atmosphere of a mixed gas of nitrogen and oxygen for 8 hours, and finally exposed to an air for use.

Figure 4:
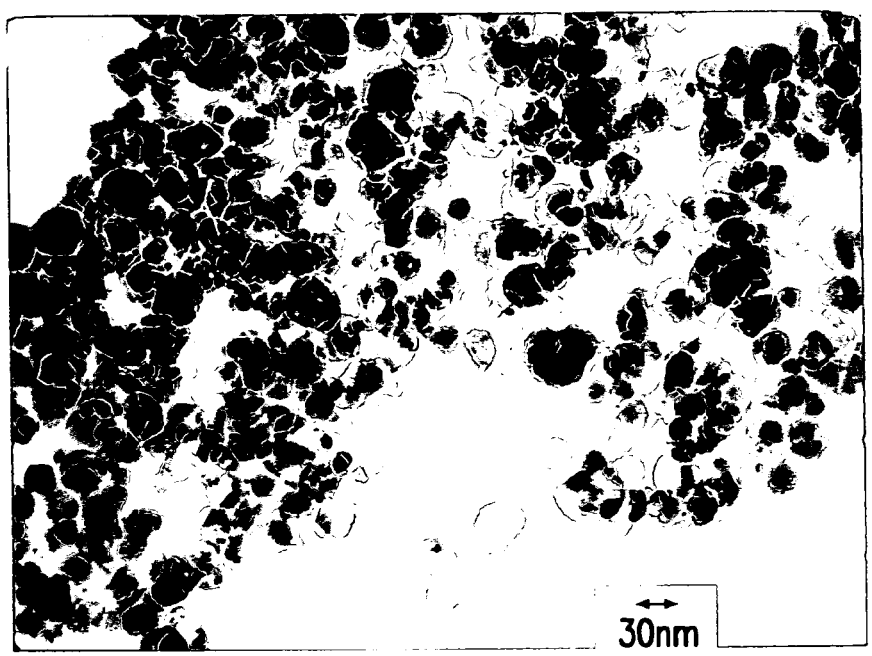
FIG. 4 shows a photograph of the particles of neodymium-iron-boron type magnetic powder used in Example 1 of the present invention, which was taken at a magnification of 250,000 with a transmission type electronic microscope.

The resultant neodymium-iron-boron magnetic powder was subjected to a fluorescent X-ray analysis, and it was found that the content of neodymium to iron was 2.4 atomic %, and the content of boron to iron, 9.1 atomic %. This magnetic powder was observed with a transmission type electronic microscope at a magnification of 250,000. As a result, the powder comprised substantially spherical or ellipsoidal particles with a particle diameter of 25 nm (hereinafter, the particle diameter is indicated by number-average particle diameter, average particle diameter or average particle size), as shown in the photograph of FIG. 4. The saturation magnetization of the magnetic powder under the application of a magnetic field of 1,273.3 kA/m was found to be 132 A.m$^2$/kg (132 emu/g), and the coercive force thereof, 191.8 kA/m (2,410 Oe).

<<Synthesis of Plate Alumina Particles>>

Sodium hydroxide (0.075 mol) and 2-aminoethanol (10 ml) were dissolved in water (80 ml) to prepare an aqueous alkaline solution. Separately from this alkaline solution, an aqueous aluminum chloride solution was prepared by dissolving aluminum chloride (III) heptahydrate (0.0074 mol) in water (40 ml). To the aqueous alkaline solution, was added dropwise the aqueous aluminum chloride solution to form a precipitate containing aluminum hydroxide. To the precipitate, was added dropwise hydrochloric acid so as to adjust the pH to 10.2. A suspension of the precipitate was aged for 20 hours, and then washed with water in an amount about 1,000 times larger than the amount of the precipitate.

Next, the supernatant was removed, and the pH of the residual suspension of the precipitate was adjusted to 10.0 with an aqueous sodium hydroxide solution. The suspension was charged in an autoclave and subjected to a hydrothermal treatment at 200° C. for 2 hours.

The resultant product was filtered and dried at 90° C. in an air. The dried product was slightly crushed in a mortar and treated by heating at 600° C. in an air for one hour. Thus, aluminum oxide particles were obtained. After the heat treatment, the aluminum oxide particles were washed with water, using an ultrasonic dispersing machine, so as to remove the non-reacted product and residues. Then, the particles were filtered and dried.

The resultant aluminum oxide (or alumina) particles were subjected to an X-ray diffraction analysis. As a result, a spectrum corresponding to γ-alumina was observed. Further, the shapes of the particles were observed with a transmission electron microscope. As a result, they were found to be square plate particles having a particle distribution of as narrow as 30 to 50 nm (average particle diameter: 40 nm).

The resultant aluminum oxide particles were further treated by heating at 1,250° C. in an air for one hour. The resultant aluminum oxide particles were subjected to an X-ray diffraction analysis. As a result, a spectrum corresponding to α-alumina was observed. Further, the shapes of the particles were observed with a transmission electron microscope. As a result, they were found to be square plate particles having a particle distribution of as narrow as 40 to 60 nm (average particle diameter: 50 nm).

<<Synthesis of Plate ITO particles>>

Sodium hydroxide (0.75 mol) and 2-aminoethanol (100 ml) were dissolved in water (800 ml) to prepare an aqueous alkaline solution. Separately from this alkaline solution, an aqueous solution of tin chloride and indium chloride was prepared by dissolving indium chloride (III) tetrahydrate (0.067 mol) and tin chloride (IV) pentahydrate (0.007 mol) in water (400 ml). To the former aqueous alkaline solution, was added dropwise the latter aqueous solution of tin chloride and indium chloride to form a precipitate of a hydroxide or a hydrate comprising tin and indium. The pH of the precipitate was 10.2. A suspension of the precipitate was aged at room temperature for 20 hours, and then washed with water until the pH of the precipitate reached 7.6.

Next, to the suspension of the precipitate, was added an aqueous sodium hydroxide solution to adjust the pH to 10.8, and the suspension was charged in an autoclave and subjected to a hydrothermal treatment at 200° C. for 2 hours.

The resultant product was washed with water until its pH reached 7.8, and filtered and dried at 90° C. in an air. The dried product was slightly crushed in a mortar and treated by heating at 600° C. in an air for one hour. Thus, particles of tin-containing indium oxide (ITO particles) were obtained. After the heat treatment, the tin-containing indium oxide particles were washed with water, using an ultrasonic dispersing machine, so as to remove the non-reacted product and residues. Then, the particles were filtered and dried.

The shapes of the resultant tin-containing indium oxide particles were observed with a transmission electron microscope. As a result, they were found to be disc or square plate particles having a particle distribution of as narrow as 30 to 50 nm (average particle diameter: 40 nm).

The tin-containing indium oxide particles were subjected to an X-ray diffraction analysis. As a result, the X-ray diffraction spectrum indicated that the particles were composed of a single structure substance which was the tin-containing indium oxide in which indium was substituted by tin.

<<Synthesis of Plate Non-Magnetic Iron Oxide Particles>>

Sodium hydroxide (0.75 mol) and 2-aminoethanol (100 ml) were dissolved in water (800 ml) to prepare an aqueous alkaline solution. Separately from this alkaline solution, an aqueous ferric chloride solution was prepared by dissolving ferric (III) chloride hexahydrate (0.074 mol) in water (400 ml). To the former aqueous alkaline solution, was added dropwise the latter aqueous ferric chloride solution to form a precipitate containing ferric hydroxide which had a pH of 11.3. A suspension of the precipitate was aged for 20 hours and washed with water until its pH reached 7.5.

Next, the supernatant was removed, and the suspension of the precipitate was charged in an autoclave and subjected to a hydrothermal treatment at 150° C. for 2 hours.

The resultant product was filtered and dried at 90° C. in an air. The dried product was slightly crushed in a mortar and treated by heating at 600° C. in an air for one hour. Thus, alpha iron oxide particles were obtained. After the heat treatment, the particles were washed with water, using an ultrasonic dispersing machine, so as to remove the non-reacted product and residues. Then, the particles were further washed with water, using the ultrasonic dispersing machine, and filtered and dried.

The resultant alpha iron oxide particles were subjected to an X-ray diffraction spectral analysis. As a result, a spectrum corresponding to an alpha hematite structure was clearly observed. Further, the shapes of the particles were observed with a transmission electron microscope. As a result, they were found to be hexagonal plate particles having a particle distribution of as narrow as 40 to 60 nm (average particle diameter: 50 nm).

| <<Components of Paint for Primer Layer>> | |
|---|---|
| (1) | |
| Plate alumina particles | 35 parts |
| (average particle diameter: 50 nm) | |
| Plate ITO particles | 65 parts |
| (average particle diameter: 40 nm) | |
| Stearic acid | 2.0 parts |

-continued

| | |
|---|---|
| Vinyl chloride-hydroxypropyl acrylate copolymer ($—SO_3Na$ group content: $0.7 \times 10^{-4}$ eq./g) | 8.8 parts |
| Polyesterpolyurethane resin (Tg: 40° C., $—SO_3Na$ group content: $1 \times 10^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

<<Components of Paint for Magnetic Layer>>

| | |
|---|---|
| (1) Kneading step | |
| Ultrafine magnetic powder (Nd—Fe—B) (Nd/Fe: 2.4 atomic %, B/Fe: 9.1 atomic %, σs: 132 A·m²/kg (132 emu/g), Hc: 192 kA/m (2,410 Oe), and particle diameter (number-average particle diameter: hereinafter referred to as average diameter): 25 nm) | 100 parts |
| Vinyl chloride-hydroxypropyl acrylate copolymer ($—SO_3Na$ group content: $0.7 \times 10^{-4}$ eq./g) | 14 parts |
| Polyesterpoyurethane resin (PU) ($—SO_3Na$ group content: $1.0 \times 10^{-4}$ eq./g) | 5 parts |
| Plate alumina particles (average particle diameter: 50 nm) | 10 parts |
| Plate ITO particles (average particle diameter: 40 nm) | 5 parts |
| Methyl acid phosphate (MAP) | 2 parts |
| Tetrahydrofuran (THF) | 20 parts |
| Methyl ethyl ketone/cyclohexanone (MEK/A) | 9 parts |
| (2) Diluting step | |
| Palmitic amide (PA) | 1.5 parts |
| n-Butyl stearate (SB) | 1 part |
| Methyl ethyl ketone/cyclohexanone (MEK/A) | 350 parts |
| (3) Compounding step | |
| Polyisocyanate | 1.5 parts |
| Methyl ethyl ketone/cyclohexanone (MEK/A) | 29 parts |

A paint for primer layer was prepared by kneading the components of Group (1) with a batch type kneader, adding the components of Group (2) to the mixture and stirring them, dispersing the mixed components with a sand mill in a residence time of 60 minutes, and adding the components of Group (3), followed by stirring and filtering the mixture.

Separately, a paint for magnetic layer was prepared by previously mixing the components for the kneading step (1) at a high rate and kneading the mixture with a continuous twin screw kneader, adding the components for the diluting step (2) and diluting the knead mixture with the continuous twin screw kneader in at least 2 steps, dispersing the mixture with a sand mill in a residence time of 45 minutes, and adding the components for the compounding step (2), followed by stirring and filtering the dispersion.

The paint for primer layer was applied on a non-magnetic support (base film) made of an aromatic polyamide film (Mictron (trade name) manufactured by Toray, thickness of 3.3 μm, MD=11 GPa, MD/TD=0.70) so that the primer layer could have a thickness of 0.6 μm after dried and calendered. Then, the paint for magnetic layer was applied on the primer layer by a wet-on-wet method so that the magnetic layer could have a thickness of 0.06 μm after the magnetic paint layer had been oriented in a magnetic field, dried and calendered. After the orientation in the magnetic field, the magnetic layer was dried with a drier and far infrared radiation to obtain a magnetic sheet. The orientation in the magnetic field was carried out by arranging N-N opposed magnets (5 kG) in front of the drier, and arranging, in the drier, two pairs of N-N opposed magnets (5 kG) at an interval of 50 cm and at a position 75 cm before a position where the dryness of the layer was felt by one's finger. The coating rate was 100 m/min.

| <<Components of Paint for Backcoat Layer>> | |
|---|---|
| Plate ITO particles (average particle diameter: 40 nm) | 80 parts |
| Carbon black (average particle diameter: 25 nm) | 10 parts |
| Plate non-magnetic iron oxide particles (average particle diameter: 50 nm) | 10 parts |
| Nitrocellulose | 45 parts |
| Polyurethane resin (containing $—SO_3Na$ groups) | 30 parts |
| Cyclohexanone | 260 parts |
| Toluene | 260 parts |
| Methyl ethyl ketone | 525 parts |

The components of a paint for backcoat layer were dispersed with a sand mill in a residence time of 45 minutes and a polyisocyanate (15 parts) was added to the mixture to obtain a paint for backcoat layer. After filtration, the paint was coated on a surface of the magnetic sheet opposite to the magnetic layer so that the resultant backcoat layer could have a thickness of 0.5 μm after dried and calendered, and then, the backcoat layer was dried to finish the magnetic sheet.

The magnetic sheet, thus obtained, was planished by seven-stage calendering using metal rolls, at a temperature of 100° C. under a linear pressure of 200 kg/cm, and wound onto a core and aged at 70° C. for 72 hours. After that, the magnetic sheet was slit into tapes with a width of ½ inch.

The components of a slitting machine (a machine for cutting the magnetic sheet into magnetic tapes with a predetermined width) was adapted for use, as follows. Tension cut rollers were arranged in the course of a web route from a position where the magnetic sheet was drawn out, to a group of slit cutters, and these tension cut rollers were made as a mesh suction type, in which porous metal was buried in the sucking portions. The machine was not provided with a mechanism for transmitting power to the cutter-driving section, and thus, the cutter-driving section was directly connected to a motor for performing direct driving.

A tape cut from the magnetic sheet was fed at a rate of 200 m/min. while the surface of the magnetic layer was being polished with a lapping tape and a blade, and wiped to provide a magnetic tape. As the lapping tape, K10000 was used; as the blade, a hard blade was used; and Toraysee (trade name) manufactured by Toray was used for wiping the magnetic layer. The tape was treated under a feeding tension of 0.294 N. The magnetic tape thus obtained was set in a cartridge to thereby provide a magnetic tape cartridge for use in a computer (hereinafter referred to as a computer tape).

Figure 3:
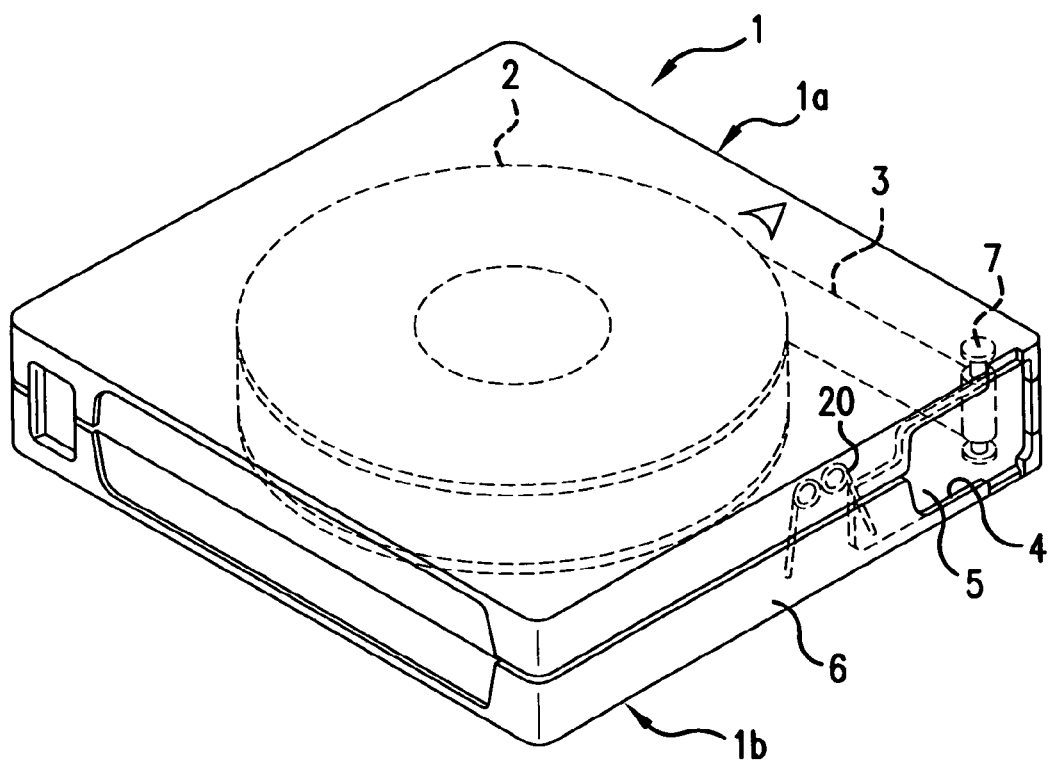
FIG. 3 is a perspective view of a magnetic tape cartridge (a tape for use in a computer) made in Examples of the present invention.

FIG. 3 shows the computer tape thus obtained. As shown in FIG. 3, this computer tape comprises a box-shaped casing body (1) constructed by joining an upper casing section (1a) to a lower casing section (1b), and one reel (2) having the magnetic tape (3) wound thereon and arranged in the casing body (1). An outlet (4) for drawing out the magnetic tape therefrom is formed at one side of the front wall (6) of the casing body (1), and the outlet (4) is opened or closed by a slidable door (5). A tape-drawing member (7) is connected to an end portion for drawing out the magnetic tape (3) so as to draw out the magnetic tape (3) wound on the reel (2) from the casing for operation. Numeral 20 in FIG. 3 refers to a door spring for forcing the door (5) to freely close the outlet.

Example 2

A computer tape was made in the same manner as in Example 1, except that magnetic powder prepared by the following synthesis was used.

<<Synthesis of Ultrafine Magnetic Powder>>

Iron nitrate (III) (0.098 mol), cobalt nitrate (0.042 mol) and neodymium nitrate (0.002 mol) were dissolved in water (200 cc). Separately from this aqueous nitrate solution, an aqueous sodium hydroxide solution was prepared by dissolving sodium hydroxide (0.42 mol) in water (200 cc). To the aqueous nitrate solution, was added the aqueous sodium hydroxide solution, and the mixture was stirred for 5 minutes to form a hydroxide of iron, cobalt and neodymium. This hydroxide was washed with water and filtered to collect the hydroxide. To the hydroxide (containing water), were further added water (150 cc) and boric acid (0.1 mol) so as to again disperse the hydroxide of iron, cobalt and neodymium in this aqueous boric acid solution. The resulting dispersion was treated by heating at 90° C. for 2 hours, and washed with water to remove the excessive boric acid. Then, the dispersion was dried at 60° C. for 4 hours to obtain a boric acid-containing hydroxide which comprised iron, cobalt and neodymium.

This hydroxide was dehydrated by heating at 300° C. in an air for 2 hours, and reduced by heating at 450° C. under a hydrogen stream for 4 hours to obtain neodymium-iron-cobalt-boron magnetic powder. Then, the magnetic powder was cooled to room temperature under a hydrogen stream, and again heated to 650° C. under an atmosphere of a mixed gas of nitrogen and oxygen. Then, the magnetic powder was treated for stabilization under the atmosphere of a mixed gas of nitrogen and oxygen for 8 hours, and exposed to an air.

The resultant neodymium-iron-cobalt-boron magnetic powder was subjected to a fluorescent X-ray analysis, and it was found that the content of neodymium to iron was 1.9 atomic %; the content of cobalt to iron, 40.1 atomic %; and the content of boron to iron, 7.5 atomic %. This magnetic powder was observed with a transmission electron microscope at a magnification of 250,000. As a result, the powder comprised substantially spherical or ellipsoidal particles with an average particle diameter (number-average particle size) of 20 nm, as in Example 1. The saturation magnetization of the magnetic powder under the application of a magnetic field of 1,273.3 kA/m was found to be 157 A.m$^2$/kg (157 emu/g), and the coercive force thereof, 174.3 kA/m (2,190 Oe).

Example 3

A computer tape was made in the same manner as in Example 1, except for magnetic powder. That is, the magnetic powder of Example 3 was prepared in the same manner as in Example 1, except that the temperature and the time of the heat treatment in an air were changed to 120° C. and 4 hour, from 200° C. and 4 hours in Example 1, and that the particle diameter was changed to 15 nm.

Example 4

A computer tape was made in the same manner as in Example 1, except that ultrafine plate magnetic powder (Ba-ferrite) (the average particle diameter (along the plane face) =25 nm; BET=67 m$^2$/g; Hc=222 kA/m (2,790 Oe); σs=49.4 A.m$^2$/kg (49.4 emu/g)) was used instead of the ultrafine granular powder.

Example 5

A computer tape was made in the same manner as in Example 4, except that the amount of the plate alumina particles for the primer layer was changed to 40 wt. parts from 10 wt. parts, and that the amount of the plate ITO particles was changed to 60 wt. parts from 90 wt. parts.

Example 6

A computer tape was made in the same manner as in Example 5, except that the thickness of the magnetic layer was changed to 0.04 μm from 0.06 μm and that the thickness of the primer layer was changed to 0.45 μm from 0.6 μm.

Example 7

A computer tape was made in the same manner as in Example 1, except that 10 wt. parts of the plate alumina particles (average particle diameter: 50 nm) and 5 wt. parts of the plate ITO particles (average particle diameter: 40 nm) in the paint for the magnetic layer were changed to 10 wt. parts of granular alumina particles (average particle diameter: 80 nm) and 2 wt. parts of carbon black particles (average particle diameter: 75 nm), respectively.

Example 8

A computer tape was made in the same manner as in Example 7, except that, in the components of the paint for the backcoat layer, 80 wt. parts of the plate ITO particles (average particle diameter: 40 nm) was changed to 0 wt. parts; 10 wt. parts of the carbon black particles (average particle diameter: 25 nm), to 80 wt. parts; 10 wt. parts of the plate iron oxide particles (average particle diameter: 50 nm), to 0 wt. part, and that 10 wt. parts of carbon black particles (average particle diameter: 0.35 μm) and 10 wt. parts of granular iron oxide particles (average particle diameter: 0.4 μm) were added to the paint for the backcoat layer.

Example 9

A computer tape was made in the same manner as in Example 1, except that the components for the paint for the primer layer in Example 1 were changed to the following.

<<Components of Paint for Primer Layer>>

(1)

| | |
|---|---|
| Needle iron oxide particles (average particle diameter: 100 nm) | 68 parts |
| Granular alumina particles (average particle diameter: 80 nm) | 8 parts |
| Carbon black particles (average particle diameter: 25 nm) | 24 parts |
| Stearic acid | 2.0 parts |
| Vinyl chloride-hydroxypropyl acrylate copolymer (—SO$_3$Na group content: 0.7 × 10$^{-4}$ eq./g) | 8.8 parts |
| Polyestepolynurethane resin (Tg: 40° C., —SO$_3$Na group content: 1 × 10$^{-4}$ eq./g) | 4.4 parts |

-continued

| <<Components of Paint for Primer Layer>> | |
|---|---|
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

Comparative Example 1

A computer tape was made in the same manner as in Example 1, except that the components of the kneading step (1) in <<Components of Paint for Magnetic Layer>> and the components of <<Paint for Primer Layer>> and <<Paint for Backcoat Layer>> were changed to the following. In this regard, the magnetic powder was changed to magnetic powder comprising needle particles with a particle diameter (average axial length) of 100 nm, and therefore, the thickness of the magnetic layer could not be controlled to 0.06 μm, and it resulted in 0.11 μm.

| <<Components of Paint for Magnetic Layer>> | |
|---|---|
| (1) Kneading step | |
| Needle ferromagnetic iron type metal powder | 100 parts |
| (Co/Fe: 30 atomic %, | |
| Y/(Fe + Co): 3 atomic %, | |
| Al/(Fe + Co): 5 atomic %, | |
| σs: 145 A·m²/kg (145 emu/g), | |
| Hc: 187 kA/m (2,350 Oe), and | |
| average axial length: 100 nm, axial ratio: 7) | |
| Vinyl chloride-hydroxypropyl acrylate copolymer | 14 parts |
| (—SO$_3$Na group content: $0.7 \times 10^{-4}$ eq./g) | |
| Polyesterpolyurethane resin (PU) | 5 parts |
| (—SO$_3$Na group content: $1.0 \times 10^{-4}$ eq./g) | |
| Granular alumina particles | 10 parts |
| (average particle diameter: 80 nm) | |
| Carbon balck particles | 5 parts |
| (average particle diameter: 75 nm) | |
| Methyl acid phosphate (MAP) | 2 parts |
| Tetrahydrofuran (THF) | 20 parts |
| Methyl ethyl ketone/cyclohemanone (MEK/A) | 9 parts |
| <<Components of Paint for Primer Layer>> | |
| (1) | |
| Needle iron oxide particles | 68 parts |
| (average particle diameter: 100 nm) | |
| Granular alumina particles | 8 parts |
| (average particle diameter: 80 nm) | |
| Carbon black particles | 24 parts |
| (average particle diameter: 25 nm) | |
| Stearic acid | 2.0 parts |
| Vinyl chloride-hydroxypropyl acrylate copolymer | 8.8 parts |
| (—SO$_3$Na group content: $0.7 \times 10^{-4}$ eq./g) | |
| Polyester-polyurethane resin | 4.4 parts |
| (Tg: 40° C., —SO$_3$Na group content: $1 \times 10^{-4}$ eq./g) | |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |
| <<Components of Paint for Backcoat Layer>> | |
| Carbon black particles | 80 parts |
| (average particle diameter: 25 nm) | |
| Carbon black particles | 10 parts |
| (average particle diameter: 0.35 μm) | |
| Granular iron oxide particles | 10 parts |
| (average particle diameter: 50 nm) | |
| Nitrocellulose | 45 parts |
| Polyurethane resin (containing SO$_3$Na groups) | 30 parts |
| Cyclohexanone | 260 parts |
| Toluene | 260 parts |
| Methyl ethyl ketone | 525 parts |

Comparative Example 2

A computer tape was made in the same manner as in Example 1, except that the components of <<Paint for Primer Layer>> and <<Paint for Backcoat Layer>> were changed to the following.

| <<Components of Paint for Primer Layer>> | |
|---|---|
| (1) | |
| Needle iron oxide particles | 68 parts |
| (average particle diameter: 100 nm) | |
| Granular alumina particles | 8 parts |
| (average particle diameter: 80 nm) | |
| Carbon black particles | 24 parts |
| (average particle diameter: 25 nm) | |
| Stearic acid | 2.0 parts |
| Vinyl chloride-hydroxypropyl acrylate copolymer | 8.8 parts |
| (—SO$_3$Na group content: $0.7 \times 10^{-4}$ eq./g) | |
| Polyester-polyurethane resin | 4.4 parts |
| (Tg: 40° C., —SO$_3$Na group content: $1 \times 10^{-4}$ eq./g) | |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |
| <<Components of Paint for Backcoat Layer>> | |
| Carbon black particles | 80 parts |
| (average particle diameter: 25 nm) | |
| Carbon black particles | 10 parts |
| (average particle diameter: 0.35 μm) | |
| Granular iron oxide particles | 10 parts |
| (average particle diameter: 50 nm) | |
| Nitrocellulose | 45 parts |
| Polyurethane resin (containing SO$_3$Na groups) | 30 parts |

-continued

| | |
|---|---|
| Cyclohexanone | 260 parts |
| Toluene | 260 parts |
| Methyl ethyl ketone | 525 parts |

Comparative Example 3

A computer tape was made in the same manner as in Comparative Example 2, except for the following. That is, the non-magnetic support (base film) was changed to an aromatic polyamide film (Mictron (trade name) manufactured by Toray; the thickness: 3.3 µm, MD=14 GPa, MD/TD=1.20) from the aromatic polyamide film (Mictron (trade name) manufactured by Toray; the thickness: 3.3 µm, MD=11 GPa, MD/TD=0.70). In addition, the components of the slitting machine were changed to the following: the tension cut roller was changed to a mesh suction roller in which a porous metal was embedded in the sucking portions of the suction type, and the direct cutter-driving by directly connecting the cutter-driving section to the motor without any mechanism for transmitting power to the cutter-driving section was changed to cutter-driving by using conventional suction type cut rollers but not the tension cut rollers, and a rubber belt and a rubber coupling were used as the mechanism for transmitting power to the cutter-driving section.

The methods for evaluation were as follows.

<Surface Roughness of Magnetic Layer>

The surface roughness of the magnetic layer was measured at a scan length of 5 µm by a scanning type white light interference method, using an universal three-dimensional surface structure analyzer, NewView 5000 manufactured by ZYGO. The view field for measurement was 350 µm×260 µm. The center line average height of the surface roughness of the magnetic layer was measured as Ra.

<Output and Ratio of Output to Noises>

The electromagnetic conversion characteristics of the magnetic tape were measured using a drum tester. The drum tester was equipped with an electromagnetic induction type head (track width: 25 µm, gap: 0.1 µm) and a MR head (8 µm) so that the induction type head was used for recording, and the MR head, for reproducing. Both heads were arranged at different positions relative to the rotary drum, and both heads were operated in the vertical direction to match their tracking with each other. A proper length of the magnetic tape was drawn out from the reel in the cartridge and discarded. A further 60 cm length of the magnet tape was drawn out and cut and processed into a tape with a width of 4 mm, which was then wound onto the outer surface of the drum.

Output and noises were determined as follows. A rectangular wave with a wavelength of 0.2 µm was written on the magnetic tape, using a function generator, and the output from the MR head was read by the spectrum analyzer. The value of a carrier with a wavelength of 0.2 µm was defined as an output C from the medium. The value of integration of a difference of the subtraction at a certain wavelength of an output and system noise of spectrum was used as a noise value N, when the rectangular wave with a wavelength of 0.2 µm was written on the magnetic tape. The ratio of the output to the noise was calculated as C/N. C and C/N are reported as relative values in relation to the values of the tape of Comparative Example 1.

<Coefficients of Temperature/Humidity Expansions of Tape>

Test pieces with a width of 12.65 mm and a length of 150 mm were prepared from the magnetic sheet along the widthwise direction. The temperature expansion coefficient was determined from difference in length between each of the test pieces exposed to atmospheres of 20° C. and 60% RH, and of 40° C. and 60% RH, respectively. The humidity expansion coefficient was determined from difference in length between each of the test pieces exposed to atmospheres of 20° C. and 30% RH, and of 20° C. and 70% RH, respectively.

<Amount of Edge Weave>

The amount of edge weave on either edge of the magnetic tape as the reference side for the running of the tape was continuously measured alongside 50 m length of the tape, using a servo writer (running speed: 5 m/sec.) equipped with an edge weave meter (Keyence). The resultant edge weave amount was subjected to Fourier analysis, and the amount of an edge weave with a cycle of f (mm) was determined. Off-track was caused by a component with a frequency V/f (1/s) of 50 (1/s) or more, on condition that the tape-running speed was V (mm/s). Accordingly, the amount of edge weave referred to in the context of the present invention is such that V/f(1/s) is not smaller than 60(1/s). In Examples and Comparative Examples, the amounts of edge weaves were determined on condition that the value of V/f (V=400 mm/s, f=65 mm) was equal to 61.5 (1/s). The amount of off-track due to edge weave was determined by running the magnetic tape with a LTO driver.

<Amount of Off-Track Due to Changes in Temperature and Humidity>

The atmosphere at a temperature of 10° C. and a humidity of 10%RH was changed to an atmosphere at a temperature of 29° C. and a humidity of 80%RH. The maximal dislocation amount between the original position of a track and a position of the same track which was dislocated due to the above change in the atmosphere (the dislocation of the track position 1,400 µm distant from the servo track) was determined from the temperature expansion coefficient and the humidity expansion coefficient of the magnetic tape.

<Decrease in Output>

From the sum of the amount of off-track due to an edge weave and the amount of off-track due to changes in temperature and humidity, a decrease in output which occurred when the same apparatus was used for recording/reproducing; and a decrease in output which occurred when an apparatus of which the position of a track was dislocated by 1.5 µm was used were determined by calculation, on condition that the recording track width was 12 µm, and the track width of the reproducing head, 10 µm.

<Fluctuation in Output>

Variation in the thickness of the magnetic layer was evaluated as follows. The magnetic tape was run at a rate of 2.54 m/sec. with a DLT driver, and signals with a wavelength of 2 µm were recorded on a 50 m length of the magnetic tape with a magnetic induction type recording head having recording tracks with a width of 76 µm. The signals were reproduced with a magnetoresistance reproducing head having tracks with a width of 38 µm. The reproducing output was read at a rate of 1,000 positions/sec. (2.54 mm intervals in the tape lengthwise direction), and fluctuation in reproducing output was measured for evaluation. The fluctuation rate of output in the tape lengthwise direction was defined by the average value of the following equation:

Average fluctuation rate (MD indicates a value in the tape lengthwise direction, which is the same also in Tables 1 to 3) (%)=(the absolute value of (output from each point−average output)/average output)×100

The above operation was carried out on five tracks along the tape widthwise direction, and the average value thereof was defined as the rate of fluctuation in output in the tape lengthwise direction. The amount of fluctuation in the tape widthwise direction was determined as follows. The above data was determined from the output value from each point in the tape lengthwise direction, by the following equation: the average fluctuation rate (TD indicates a value in the tape widthwise direction, which means the same also in Tables 1 to 3) (%)=(the absolute value of (output from each track−an average of outputs from five tracks)/an average of outputs from five tracks)×100.

An average of outputs from the respective points within a 50 m length of the tape was defined as an output fluctuation rate in the tape widthwise direction.

Tables 1 to 3 show the results of the above evaluations and the conditions employed in Examples and Comparative Examples.

TABLE 1

|  |  |  | Ex. 1 | Ex. 2 | Ex. 3 | Ex. 4 | Ex. 5 | Ex. 6 |
|---|---|---|---|---|---|---|---|---|
| Magnetic layer | Magnetic powder | Element | Nd—Fe—B | Nd—Fe—Co—B | Nd—Fe—B | Ba—Fe | Ba—Fe | Ba—Fe |
|  |  | Shape | Grain | Grain | Grain | Plate | Plate | Plate |
|  |  | Particle size | 25 | 20 | 15 | 25 | 25 | 25 |
|  | Filler | Plate alumina (50 nm) | 10 | 10 | 10 | 10 | 10 | 10 |
|  |  | Granular alumina (80 nm) |  |  |  |  |  |  |
|  |  | CB (75 μm) |  |  |  |  |  |  |
|  |  | Plate ITO (40 nm) | 5 | 5 | 5 | 5 | 5 | 5 |
| Primer layer | Filler | Plate alumina (50 nm) | 10 | 10 | 10 | 10 | 40 | 40 |
|  |  | Needle iron oxide (100 nm) |  |  |  |  |  |  |
|  |  | Granular alumina (80 nm) |  |  |  |  |  |  |
|  |  | CB (25 nm) |  |  |  |  |  |  |
|  |  | Plate ITO (40 nm) | 90 | 90 | 90 | 90 | 60 | 60 |
| BC layer | Filler | CB (25 nm) | 10 | 10 | 10 | 10 | 10 | 10 |
|  |  | CB (0.35 μm) |  |  |  |  |  |  |
|  |  | Granular iron oxide (0.4 μm) |  |  |  |  |  |  |
|  |  | Plate iron oxide (50 nm) | 10 | 10 | 10 | 10 | 10 | 10 |
|  |  | Plate ITO (40 nm) | 80 | 80 | 80 | 80 | 80 | 80 |
| Thickness of magnetic layer (μm) |  |  | 0.06 | 0.06 | 0.06 | 0.06 | 0.06 | 0.04 |
| Thickness of primer layer (μm) |  |  | 0.6 | 0.6 | 0.6 | 0.6 | 0.6 | 0.45 |
| Thickness of support (μm) |  |  | 3.3 | 3.3 | 3.3 | 3.3 | 3.3 | 3.3 |
| Thickness of BC layer (μm) |  |  | 0.5 | 0.5 | 0.5 | 0.5 | 0.5 | 0.5 |
| Total thickness (μm) |  |  | 4.46 | 4.46 | 4.46 | 4.46 | 4.46 | 4.29 |
| Young's modulus of base film (MD) (GPa) |  |  | 11 | 11 | 11 | 11 | 11 | 11 |
| Young's modulus of base film (MD/TD) |  |  | 0.70 | 0.70 | 0.70 | 0.70 | 0.70 | 0.70 |
| Slitting machine |  |  | M + D | M + D | M + D | M + D | M + D | M + D |
| Surface roughness Ra (μm) |  |  | 2.2 | 2.4 | 2.1 | 2.1 | 2.0 | 2.1 |
| C (dB) |  |  | 2.2 | 2.6 | 2.0 | −3.6 | −3.3 | −3.6 |
| C/N (dB) |  |  | 8.4 | 9.5 | 10.5 | 7.9 | 8.2 | 8.1 |
| Temperature expansion coefficient (TD) ($\times 10^{-6}/°C$) |  |  | 1.2 | 1.1 | 1.1 | 1.0 | 0.9 | 0.9 |
| Humidity expansion coefficient (TD) ($\times 10^{-6}/\%RH$) |  |  | 8.8 | 9.0 | 8.7 | 8.5 | 6.5 | 6.5 |
| Amount of edge weave (μm) |  |  | 0.6 | 0.6 | 0.6 | 0.6 | 0.5 | 0.5 |
| Amount of off-track due to edge weave (μm) |  |  | 0.08 | 0.08 | 0.08 | 0.08 | 0.07 | 0.07 |
| Amount of off-track due to temperature and humidity expansions (μm) |  |  | 0.89 | 0.91 | 0.88 | 0.86 | 0.66 | 0.66 |
| Total amount of off-track (μm) |  |  | 0.97 | 0.99 | 0.96 | 0.94 | 0.73 | 0.73 |
| Decrease in output (using the same apparatus) (%) |  |  | 0 | 0 | 0 | 0 | 0 | 0 |
| Decrease in output (using an apparatus in which 1.5 μm dislocation of track occurs) (%) |  |  | 15 | 15 | 15 | 14 | 12 | 12 |
| Average fluctuation rate of output (MD) (%) |  |  | 7.2 | 7.5 | 6.6 | 6.8 | 5.5 | 6.1 |

TABLE 1-continued

|  | Ex. 1 | Ex. 2 | Ex. 3 | Ex. 4 | Ex. 5 | Ex. 6 |
|---|---|---|---|---|---|---|
| Average fluctuation rate of output (TD) (%) | 7.0 | 6.9 | 5.2 | 5.3 | 5.1 | 5.4 |

Slitting machine:

M + D: mesh suction + direct driving

S + G: conventional suction + rubber belt, and driving by the use of rubber coupling

TABLE 2

| | | | Ex. 7 | Ex. 8 | Ex. 9 |
|---|---|---|---|---|---|
| Magnetic layer | Magnetic powder | Element | Nd—Fe—B | Nd—Fe—B | Nd—Fe—B |
| | | Shape | Grain | Grain | Grain |
| | | Particle size | 25 | 25 | 25 |
| | Filler | Plate alumina (50 nm) | | | 10 |
| | | Granular alumina (80 nm) | 10 | 10 | |
| | | CB (75 μm) | 2 | 2 | |
| | | Plate ITO (40 μm) | | | 5 |
| Primer layer | Filler | Plate alumina (50 nm) | 10 | 10 | |
| | | Needle iron oxide (100 nm) | | | 68 |
| | | Granular alumina (80 nm) | | | 8 |
| | | CB (25 nm) | | | 24 |
| | | Plate ITO (40 nm) | 90 | 90 | |
| BC layer | Filler | CB (25 nm) | 10 | 80 | 10 |
| | | CB (0.35 μm) | | 10 | |
| | | Granular iron oxide (0.4 μm) | | 10 | |
| | | Plate iron oxide (50 nm) | 10 | | 10 |
| | | Plate ITO (40 nm) | 80 | | 80 |
| Thickness of magnetic layer (μm) | | | 0.06 | 0.06 | 0.06 |
| Thickness of primer layer (μm) | | | 0.6 | 0.6 | 0.6 |
| Thickness of support (μm) | | | 3.3 | 3.3 | 3.3 |
| Thickness of BC layer (μm) | | | 0.5 | 0.5 | 0.5 |
| Total thickness (μm) | | | 4.46 | 4.46 | 4.46 |
| Slitting machine | | | M + D | M + D | M + D |
| Young's modulus of base film (MD) (GPa) | | | 11 | 11 | 11 |
| Young's modulus of base film (MD/TD) | | | 0.70 | 0.70 | 0.70 |
| Surface roughness Ra (nm) | | | 3.4 | 3.8 | 3.2 |
| C (dB) | | | 1.8 | 1.4 | 1.6 |
| C/N (dB) | | | 8 | 7.2 | 6.5 |
| Temperature expansion coefficient (TD) ($\times 10^{-6}$/° C.) | | | 1.3 | 1.8 | 2.0 |
| Humidity expansion coefficient (TD) ($\times 10^{-6}$/% RH) | | | 9.0 | 9.7 | 9.9 |
| Amount of edge weave (μm) | | | 0.6 | 0.7 | 0.7 |
| Amount of off-track due to edge weave (μm) | | | 0.08 | 0.1 | 0.1 |
| Amount of off-track due to temperature and humidity expansions (μm) | | | 0.92 | 1.00 | 1.02 |
| Total amount of off-track (μm) | | | 1.00 | 1.10 | 1.12 |
| Decrease in output (using the same apparatus) (%) | | | 0 | 1.0 | 1.2 |
| Decrease in output (using an apparatus in which 1.5 pm dislocation of track occurs) (%) | | | 15 | 16 | 17 |
| Average fluctuation rate of output (MD) (%) | | | 7.7 | 7.8 | 7.5 |
| Average fluctuation rate of output (TD) (%) | | | 7.0 | 7.5 | 6.8 |

Slitting machine:

M + D: mesh suction + direct driving

S + G: conventional suction + rubber belt, and driving by the use of rubber coupling

TABLE 3

| | | | C. Ex. 1 | C. Ex. 2 | C. Ex. 3 |
|---|---|---|---|---|---|
| Magnetic layer | Magnetic powder | Element<br>Shape | Y—Fe—Co | Nd—Fe—B | Nd—Fe—B |
| | | Particle size | 100 | 25 | 25 |
| | Filler | Plate alumina (50 nm) | | 10 | 10 |
| | | Granular alumina (80 nm) | 10 | | |
| | | CB (75 μm) | 2 | | |
| | | Plate ITO (40 nm) | | 5 | 5 |
| Primer layer | Filler | Plate alumina (50 nm) | | | |
| | | Needle iron oxide (100 nm) | 68 | 68 | 68 |
| | | Granular alumina (80 nm) | 8 | 8 | 8 |
| | | CB (25 nm) | 24 | 24 | 24 |
| | | Plate ITO (40 nm) | | | |
| BC layer | Filler | CB (25 nm) | 80 | 80 | 80 |
| | | CB (0.35 μm) | 10 | 10 | 10 |
| | | Granular iron oxide (0.4 μm) | 10 | 10 | 10 |
| | | Plate iron oxide (50 nm) | | | |
| | | Plate ITO (40 nm) | | | |
| Thickness of magnetic layer (μm) | | | 0.11 | 0.06 | 0.06 |
| Thickness of primer layer (μm) | | | 0.6 | 0.6 | 0.6 |
| Thickness of support (μm) | | | 3.3 | 3.3 | 3.3 |
| Thickness of BC layer (μm) | | | 0.5 | 0.5 | 0.5 |
| Total thickness (μm) | | | 4.51 | 4.46 | 4.46 |
| Slitting machine | | | M + D | M + D | S + G |
| Young's modulus of base film (MD) (GPa) | | | 11 | 11 | 14 |
| Young's modulus of base film (MD/TD) | | | 0.70 | 0.70 | 1.2 |
| Surface roughness Ra (nm) | | | 4.2 | 3.5 | 3.3 |
| C (dB) | | | 0 | 1.3 | 1.5 |
| C/N (dB) | | | 0 | 6.0 | 6.3 |
| Temperature expansion coefficient (TD) ($\times 10^{-6}/°C$) | | | 2.2 | 2.0 | 17.4 |
| Humidity expansion coefficient (TD) ($\times 10^{-6}/\%$ RH) | | | 10.5 | 10.2 | 10.4 |
| Amount of edge weave (μm) | | | 0.8 | 0.8 | 2.5 |
| Amount of off-track due to edge weave (μm) | | | 0.11 | 0.11 | 0.34 |
| Amount of off-track due to temperature and humidity expansions (μm) | | | 1.09 | 1.11 | 1.48 |
| Total amount of off-track (μm) | | | 1.20 | 1.22 | 1.82 |
| Decrease in output (using the same apparatus) (%) | | | 2.0 | 2.2 | 8.2 |
| Decrease in output (using an apparatus in which 1.5 μm dislocation of track occurs) (%) | | | 17 | 17 | 23 |
| Average fluctuation rate of output (MD) (%) | | | 10.1 | 15.2 | 16.1 |
| Average fluctuation rate of output (TD) (%) | | | 9.4 | 13.1 | 13.4 |

Slitting machine:
M + D: mesh suction + direct driving
S + G: conventional suction + rubber belt, and driving by the use of rubber coupling As is apparent from Tables 1 to 3, the computer tapes (the magnetic tapes) of Examples 1 to 9 of the present invention are excellent in electromagnetic conversing properties and stability against changes in temperature and humidity, and are smaller in amounts of edge weaves, as compared with the computer tapes of Comparative Examples 1 and 2. Therefore, the computer tapes of the present invention show less amounts of off-track even when the temperature and the humidity change. In addition, the computer tapes of the present invention show less fluctuations in outputs both in the tape lengthwise direction and the tape widthwise direction: in other words, the magnetic layers of the present invention have less variation in thickness. In this regard, the amount of off-track is evaluated based on the calculation, on condition that the recording track width is 12 μm, and the track width of the reproducing head, 10 μm. The difference in amount of off-track between the computer tapes of Examples and the computer tapes of Comparative Examples will be more distinguishing, taken into consideration a possible recording track width of 10 μm or less which a computer tape with a capacity

EFFECT OF THE INVENTION

According to the present invention, there are provided a magnetic tape and a magnetic tape cartridge which show high reproducing outputs and high ratios of C/N, and are excellent in stability against changes in temperature and humidity. Thus, a backup tape for use in a computer, capable of corresponding to a recording capacity of, for example, 1 TB or more, can be realized.

The invention claimed is:

1. A magnetic tape comprising a non-magnetic support, a magnetic layer containing a magnetic powder which is formed on one side of the non-magnetic support, wherein said magnetic powder comprises plate or granular magnetic particles with a particle diameter of 5 to 50 nm, and a thickness of said magnetic layer is 0.01 μm to 0.05 μm, a primer layer containing non-magnetic powder which is formed between the non-magnetic support and the magnetic layer, and a backcoat layer containing non-magnetic powder which is formed on the other side of the non-magnetic support, wherein the coefficient of temperature expansion in the tape widthwise direction is $(0 \text{ to } 8) \times 10^{-6}/°C.$, and the coefficient of humidity expansion in the tape widthwise direction is $(0 \text{ to } 10) \times 10^{-6}/\%RH$; wherein the amount of edge weave present on either edge of the magnetic tape as the reference side for the running of the tape is less than 0.8 μm; and wherein a rate of fluctuation in reproducing output in at least one of a tape lengthwise direction and a tape widthwise direction is 10% or less.

2. The magnetic tape according to claim 1, wherein at least one of the primer layer and the backcoat layer contains non-magnetic plate particles with a particle diameter of 10 to 100 nm.

3. The magnetic tape according to claim 1, wherein at least one of said primer layer and said backcoat layer contains non-magnetic plate particles.

4. The magnetic tape according to claim 1, wherein said primer layer contains carbon black having a particle diameter of 0.01 to 0.1 μm and aluminum oxide having a particle diameter of 0.1 to 0.5 μm.

5. The magnetic tape according to claim 1, wherein said rate of fluctuation in reproducing output is at least 5.1%.

6. A magnetic tape comprising a non-magnetic support, a magnetic layer containing magnetic powder which is formed on one side of the non-magnetic support, wherein said magnetic powder comprises plate or granular magnetic particles with a particle diameter of 5 to 50 nm, and a thickness of said magnetic layer is 0.05 μm to 0.09 μm, a primer layer containing non-magnetic powder which is formed between the non-magnetic support and the magnetic layer, and a backcoat layer containing non-magnetic powder which is formed on the other side of the non-magnetic support, wherein the coefficient of temperature expansion in the tape widthwise direction is $(0 \text{ to } 8) \times 10^{-6}/°C.$, and the coefficient of humidity expansion in the tape widthwise direction is $(0 \text{ to } 10) \times 10^{-6}/\%RH$; wherein the amount of edge weave present on either edge of the magnetic tape as the reference side for the running of the tape is less than 0.8 μm; and wherein a rate of fluctuation in reproducing output in at least one of a tape lengthwise direction and a tape widthwise direction is 8% or less.

7. The magnetic tape according to claim 6, wherein said rate of fluctuation in reproducing output is at least 5.1%.

8. The magnetic tape according to claim 6, wherein at least one of said primer layer and said backcoat layer contains non-magnetic plate particles.

9. The magnetic tape according to claim 8, wherein said non-magnetic plate particles have a particle diameter of 10 to 100 nm.

10. The magnetic layer according to claim 6, wherein said primer layer contains carbon black having a particle diameter of 0.01 to 0.1 μm and aluminum oxide having a particle diameter of 0.1 to 0.5 μm.

11. The magnetic tape according to claim 7, wherein at least one of said primer layer and said backcoat layer contains non-magnetic plate particles.

12. The magnetic tape according to claim 11, wherein said non-magnetic plate particles have a particle diameter of 10 to 100 nm.

13. The magnetic layer according to claim 7, wherein said primer layer contains carbon black having a particle diameter of 0.01 to 0.1 μm and aluminum oxide having a particle diameter of 0.1 to 0.5 μm.

* * * * *